(12) United States Patent
Feng

(10) Patent No.: US 11,181,808 B2
(45) Date of Patent: *Nov. 23, 2021

(54) LENS CAP FOR OPTICAL PROJECTORS

(71) Applicant: Hand Held Products, Inc., Charlotte, NC (US)

(72) Inventor: Chen Feng, Snohomish, WA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,020

(22) Filed: Sep. 14, 2020

(65) Prior Publication Data

US 2020/0409236 A1 Dec. 31, 2020

Related U.S. Application Data

(63) Continuation of application No. 16/114,501, filed on Aug. 28, 2018, now Pat. No. 10,824,052.

(51) Int. Cl.
  *G03B 11/04* (2021.01)
  *G03B 21/13* (2006.01)
  *G03B 21/54* (2006.01)

(52) U.S. Cl.
  CPC ............ *G03B 11/041* (2013.01); *G03B 21/13* (2013.01); *G03B 21/54* (2013.01)

(58) Field of Classification Search
  None
  See application file for complete search history.

(56) References Cited

U.S. PATENT DOCUMENTS

| | | | |
|---|---|---|---|
| 6,377,400 B1 * | 4/2002 | Hollander | G01J 5/02 359/618 |
| 7,085,076 B2 | 8/2006 | Sallander | |
| 7,399,945 B2 | 7/2008 | Talwar et al. | |
| 2010/0157019 A1 | 6/2010 | Schwotzer et al. | |
| 2015/0363905 A1 | 12/2015 | Pepperell et al. | |

OTHER PUBLICATIONS

Non-Final Rejection dated Jan. 8, 2020 for U.S. Appl. No. 16/114,501.
Notice of Allowance and Fees Due (PTOL-85) dated Jun. 18, 2020 for U.S. Appl. No. 16/114,501.
U.S. Patent Application Methods, Systems, and Apparatuses for Computing Dimensions of an Object Using Range Images, Unpublished (filed Jun. 21, 2018), Ryan Andrew Lloyd (inventor), Hand Held Products, Inc. (assignee), U.S. Appl. No. 16/014,851.

* cited by examiner

*Primary Examiner* — Michelle M Iacoletti
*Assistant Examiner* — Danell L Owens
(74) *Attorney, Agent, or Firm* — Alston & Bird LLP

(57) ABSTRACT

Various embodiments described herein relates to a lens cap, adapted to be mechanically engaged over a lens assembly of an optical projector. The lens cap, as described herein, is adapted for vignetting a light pattern projected by the optical projector. The lens cap includes a front surface and a back surface, where on at least a portion of the front surface, an elliptically shaped aperture is defined. In this aspect, the elliptically shaped aperture is chamfered towards its peripheral ends, as the elliptically shaped aperture extends out from the back surface of the lens cap towards the front surface of lens cap. Also, the elliptically shaped aperture is defined on the lens cap such that, a center axis of the aperture is offset to a central axis of the lens cap, so as to match an offset at which the light pattern is projected by the optical projector.

19 Claims, 19 Drawing Sheets

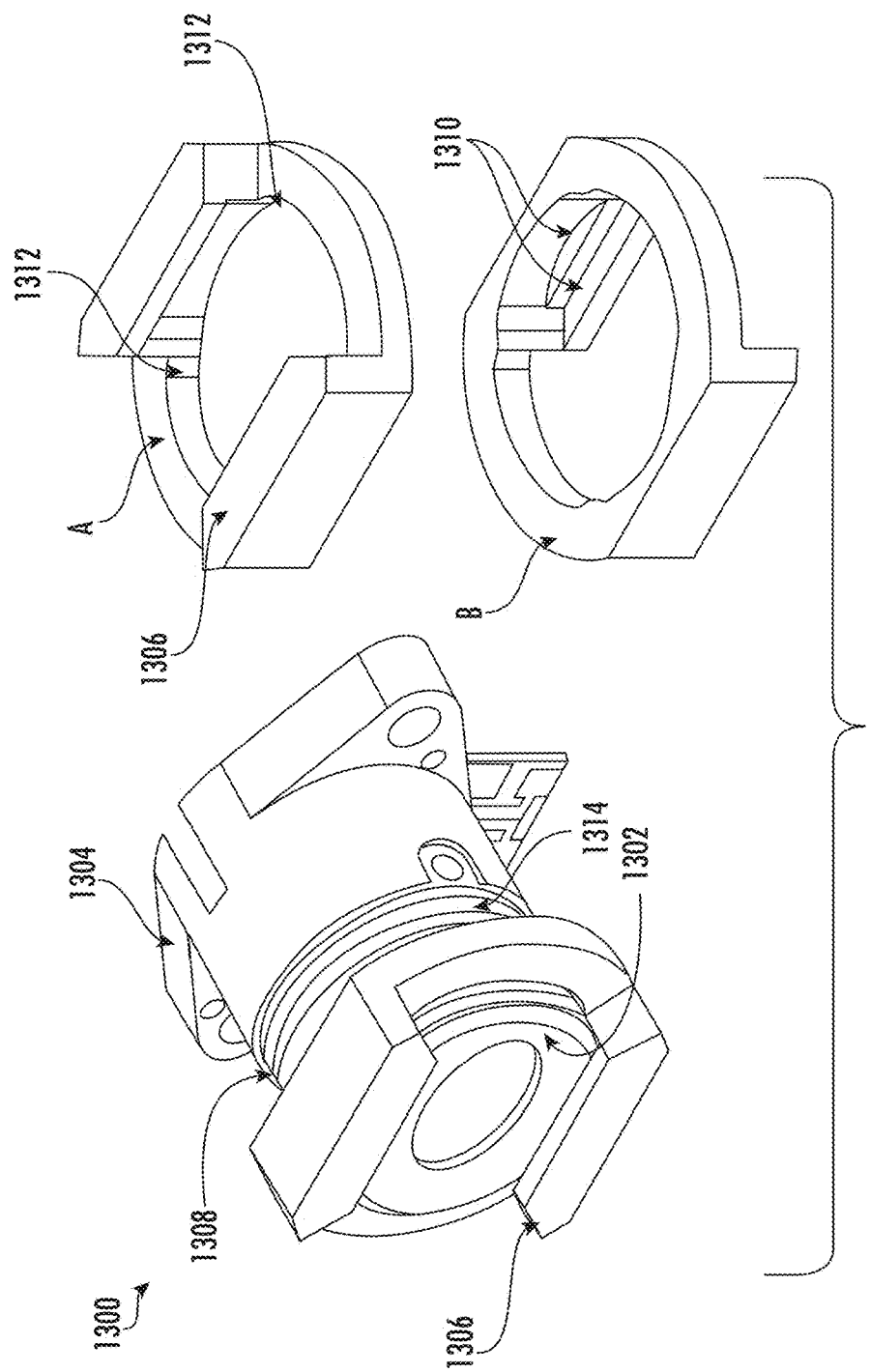
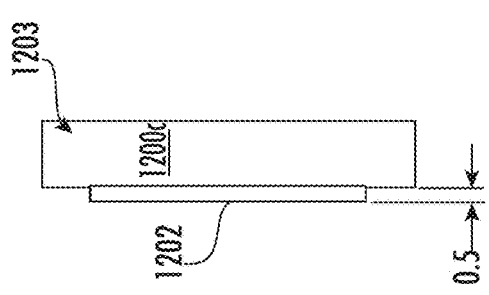
FIG. 12C
FIG. 13

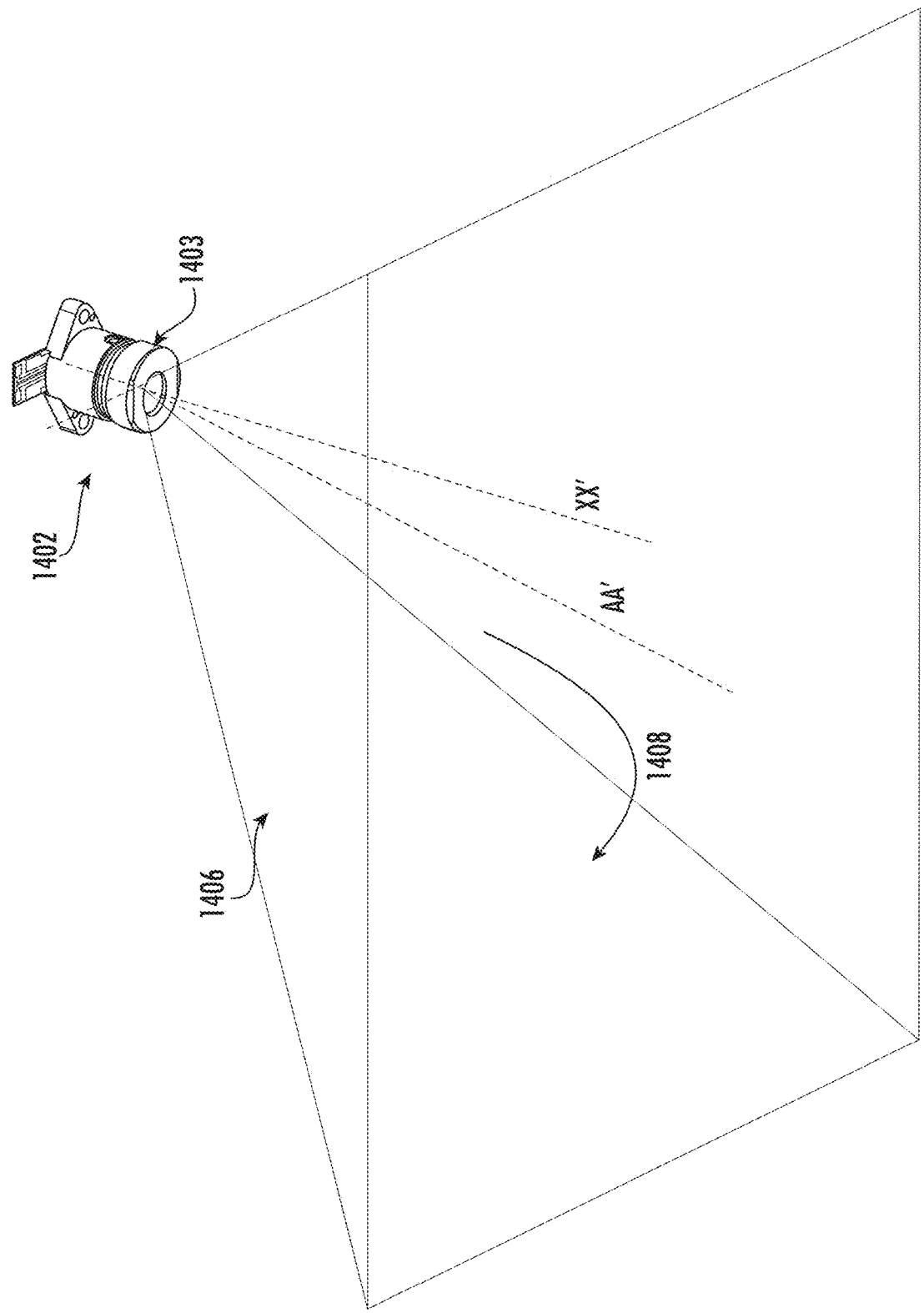

LENS CAP FOR OPTICAL PROJECTORS

CROSS-REFERENCE TO RELATED APPLICATIONS

This application is a continuation of U.S. application Ser. No. 16/114,501, filed Aug. 28, 2018, the entire contents of which are incorporated herein by reference.

BACKGROUND

Generally, optical projectors are used in a variety of environments for projecting light in a field of view, for different purposes. For example, in some cases, these projectors are used for depth sensing of 3D objects by casting a pattern of structured light or coded light on the 3D objects. The optical projector, usually, includes a light source, such as a laser diode or light-emitting diode, to generate optical radiation, for instance, in the form of a laser beam. In some cases, the optical radiation may be projected as a pattern on the objects by using masking elements or filters or diffracting elements. These optical projectors that are adapted to project a light pattern, for example, as a structured light, are also used in object dimensioning systems, having range cameras, for three-dimensional (3D) dimensioning of the objects. Applicant has identified a number of deficiencies and problems associated with conventional optical projectors. Through applied effort, ingenuity, and innovation, many of these identified problems have been solved by developing solutions that are included in embodiments of the present disclosure, many examples of which are described in detail herein.

BRIEF SUMMARY

Various embodiments of the present disclosure as described herein, relate generally to a structure of a lens cap, particularly, a lens cap that is adapted to be mechanically engaged on a lens assembly of an optical projector, for example, but not limited to, a light pattern projector.

According to an embodiment, a lens cap having a back surface and a front surface, is described. In this regard, the back surface of the lens cap is adapted to be mechanically engaged over a light pattern projector. The light pattern projector, as mentioned herein, is adapted to project a structured light, in a field of view. In accordance with said embodiment, a portion of the front surface, defines an elliptically shaped aperture that is adapted to provide a vignetting on the structured light projected from the pattern projecting unit.

In accordance with another embodiment, a lens cap is described. The lens cap has a back surface that is adapted to be mechanically engaged over a light pattern projector and a front surface. In this aspect, on a portion of the front surface of the lens cap, an elliptically shaped aperture (opening) is defined. In this regard, the elliptically shaped aperture is adapted to provide vignetting on a light pattern that is projected from the light pattern projector. In accordance with said embodiments, a periphery of the elliptically shaped aperture is chamfered, as the aperture extends out from the back surface to the front surface of the lens cap. The elliptically shaped aperture defines a center of the axis that passes orthogonally through the front surface and the back surface of the lens cap and via a point of intersection of a major axis and a minor axis of the elliptically shaped aperture. To this extent, the center axis of the elliptically shaped aperture is offset from a central axis of the lens cap.

In an aspect, according to said embodiment, a cross-section of the elliptically shaped aperture is adapted to match a field of view of the light pattern projecting unit, as the lens cap is mechanically engaged over a lens assembly of the light pattern projecting unit. In another aspect, according to said embodiments, the elliptically shaped aperture of the lens cap is adapted to at least, block or partially allow, outermost rays which are at periphery of a projected laser beam defining the projected pattern, as the light pattern projected from a lens assembly of the light pattern projecting unit passes through the elliptically shaped aperture of the lens cap.

In another aspect, according to said embodiment, a length of the major axis and a length of the minor axis of the elliptically shaped aperture is based on a defined value to which the projected light pattern is offset from a center axis of the lens of the light pattern projecting unit. In another aspect, in accordance with said embodiments, a slope of the chamfered periphery of the elliptically shaped aperture is based on at least one of: (i) an axial distance between a lens assembly of the light pattern projecting unit and the back surface of the lens cap and (ii) a corner reduction ratio of the projected pattern, wherein the corner reduction ratio is representative of a desired percentage decrease, in intensity of outermost rays of a projected laser beam defining the projected light pattern.

In accordance with said embodiment, the slope of the chamfered periphery of the elliptically shaped aperture causes vignetting of the outermost rays of the projected laser beam defining the projected pattern. In this regard, the offset in the center axis of the elliptically shaped aperture is to match an offset of the projected light pattern projected by a light source through a lens assembly of the light pattern projecting unit.

According to another embodiment, an imaging system is described. The imaging system includes a light pattern projecting unit having a projector lens assembly. In this aspect, the light pattern projecting unit is adapted to project structured light in its field of view. The imaging system also includes, a lens cap having a front surface and a back surface. In this regard, the back surface is adapted to be mechanically engaged over the projector lens assembly of the light pattern projecting unit. In an aspect, according to said embodiment, the elliptically shaped aperture is chamfered towards a periphery at which the elliptically shaped aperture extends out from the back surface to the front surface of the lens cap. Also, in an aspect, according to said embodiment, a center axis, passing orthogonally through the front surface and the back surface and via a point of intersection of a major axis and a minor axis of the elliptically shaped aperture, is offset from a central axis of the lens cap. In another aspect, according to said embodiment, the imaging system further includes an imaging unit, including an image sensor. In this regard, the imaging unit is adapted to capture an image of a reflection of the structured light, sensed by the image sensor in a field of view of the imaging unit. In this aspect, (i) a slope of the chamfered periphery of the elliptically shaped aperture causes vignetting of outermost rays of projected laser beam defining the projected structured light and (ii) the offset in the center axis of the elliptically shaped aperture is to match an offset of the projected structured light towards a field of view of the imaging unit The above summary is provided merely for purposes of providing an overview of one or more exemplary embodiments described herein so as to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained in the following description and its accompanying drawings.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 12A, 12B, and 12C schematically illustrates structures of a front surface and back surface respectively of a lens cap having a cylindrically shaped back casing, in accordance with some example embodiments as described herein.

FIG. 13 schematically illustrates alignment features adapted to be used for mechanically engaging a lens cap over a lens assembly of a light pattern projector, in accordance with some embodiments described herein.

FIGS. 14D and 14E schematically illustrates multiple perspective views of a lens cap mechanically engaged over the light pattern projector that is adapted to project a light pattern spatially offset in one direction with respect an axis of a lens assembly of the light pattern projector, in accordance with some example embodiments described herein;

DETAILED DESCRIPTION

Figure 1:
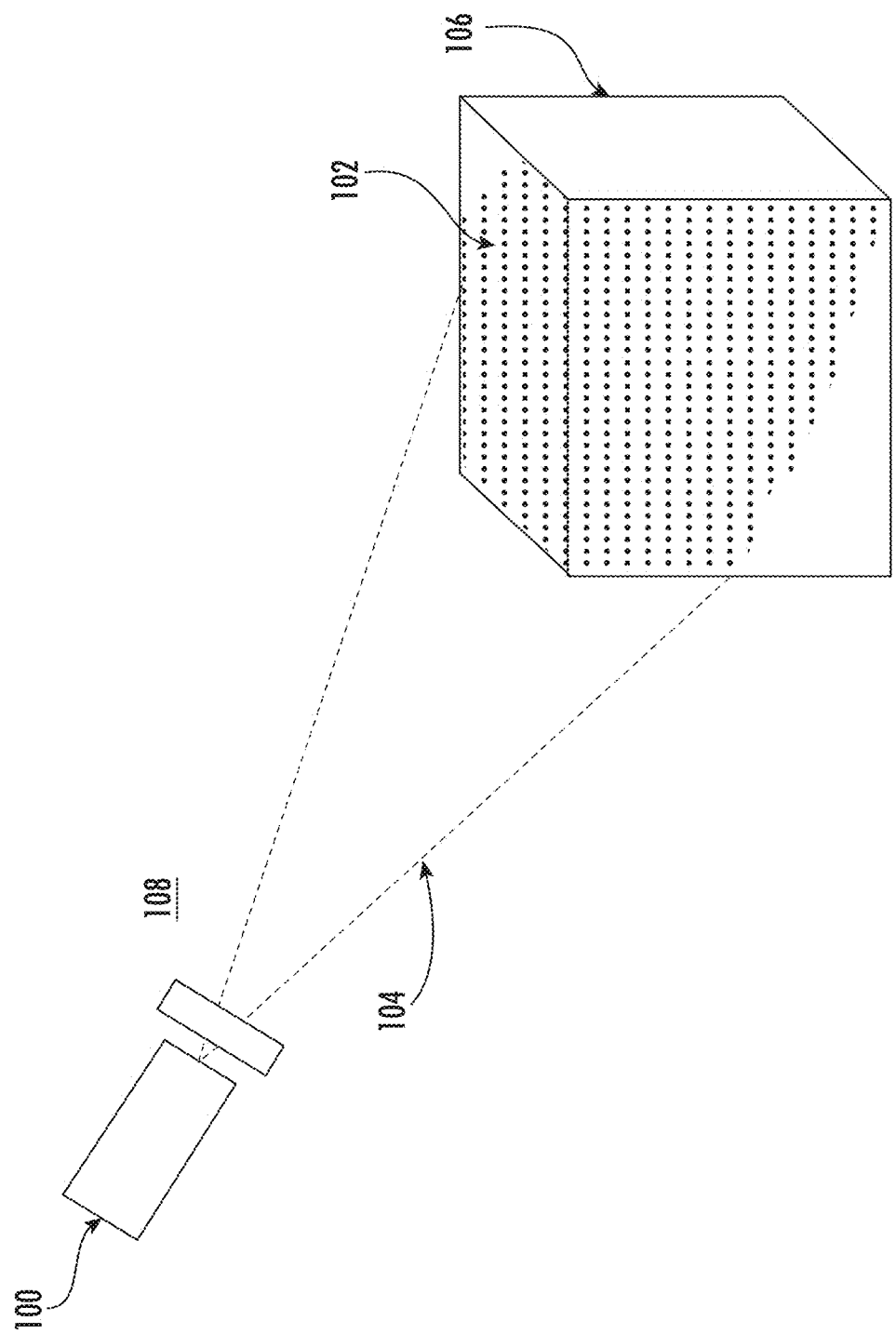
FIG. 1 schematically depicts an exemplary environment including a light pattern projector, in accordance with some embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might"

(or other such language) be included or have a characteristic, that particular component or feature is not required to be included or to have the characteristic. Such component or feature may be optionally included in some embodiments, or it may be excluded.

The term "object" as used herein may correspond to a physical item, element, device, or the like that is present in a scene. For example, a warehouse or a retail outlet (e.g., a scene) may include objects, parcels, cartons, shipping containers, and/or the like. In some examples, the object may be a static object or a dynamic object. The static object in a scene may correspond to an object which remains substantially stationary over a period of time. For example, static objects in a warehouse may include structural support elements, such as pillars, walls, and/or the like of the warehouse. A dynamic object may correspond to an object with a location in the warehouse that is not fixed. For example, the location of one or more parcels in warehouse may not be fixed, as the one or more parcels may be shipped-in, shipped-out, or otherwise moved in the warehouse (e.g., scene).

Usually, while designing and manufacturing optical projectors, in addition to along with consideration given for internal assembling of components and structure of the optical projectors, consideration is given to power output levels and maintaining intensity of optical radiation, at which the optical projector projects light. Also, mostly in environments that include imaging systems, for example multiple cameras and image processors, light pattern projectors may be used for illuminating various objects to identify three-dimensional (3D) objects in a field of view and/or to compute dimensions of the objects. Such light pattern projectors, usually, include a high-power light source, for instance, a vertical-cavity surface-emitting laser (VCSEL) laser source or laser diode along with a pattern masking element, for projecting a structured light, i.e. a pattern of light or optical radiation in coded or known pattern form, on an object. In systems, for example, warehouses or distribution centers, where such pattern projectors are used along with imagers, for example, one or more cameras, the pattern projectors are used to project the structured light on an object that is to be dimensioned. The reflection of the structured light from the object is realized in a field of view of the one or more camera units, which thereafter captures its images for computing the dimensions of the object.

Designing such light pattern projectors, requires optical emission, for example, laser beam emission from a light source of the pattern projectors, to meet safety standards of laser emissions, as prescribed by various agencies (e.g., European Norm (EN) 207, American National Standards Institute (ANSI) Z136, and/or the like). Accordingly, while designing the light pattern projectors, it is often considered that, in operation, the light pattern projected from a light pattern projector is of uniform intensity and within permissible safety radiation limits, as it is projected on a plane surface (e.g., a projection screen). However, safety standards of laser emissions are evaluated based on the intensity of the light pattern a predefined distance from the projectors (e.g., on a spherical surface). As, usually, these light pattern projectors are designed to provide a uniform intensity light pattern on a flat screen (i.e. surfaces where edges of a screen surface are farther from the projector than a center of the screen surface), the light rays defining the light pattern towards its edges have increased intensity/light output level, as compared to, intensity values of light rays of the pattern profile, which are towards center of the projected light pattern. To this extent, when the projected light pattern is evaluated at a spherical surface, in various scenarios it is observed that the intensity of optical radiation defining the edges of the projected light pattern surpasses laser safety standards while the central portion of the projected light pattern is safely within the laser safety standards.

To this extent, some existing techniques used for controlling and/or reducing intensity/output level of light projectors require, customizing a masking element of the light pattern projector, for example, with a grey scale pattern that matches a mask transmittance distribution of the masking element with a desired energy distribution. However, such techniques are usually costly when compared to using a standard binary masking element in the light pattern projectors. Also, controlling illumination quality of the projectors, while using such masking elements, is challenging. Alternatively, some other existing approaches rely on performing structural changes to lens and other elements of the light pattern projector assembly. However, such structural changes also do not provide effective control over a desired power output level. Further, in imaging systems where light patterns are projected at an offset towards an imaging unit, such internal changes in the projector lens assembly, often causes sharp decrease in intensity level of projection towards one side of a profile of the light pattern, thereby, reducing an overall performance in entire field of view of the projector. Accordingly, it is desired, to effectively suppress and/or control corner peak radiation, i.e. intensity of outermost light rays defining the edges and/or perimeter of a projected light pattern.

Various embodiments described herein, relate to a lens cap that can be used along with a light pattern projector. In this regard, the lens cap is adapted to be engaged mechanically over a lens assembly of the light pattern projector. The lens cap has an elliptically shaped aperture defined through a portion of its body, that facilitates 'vignetting' (i.e. fading/reducing intensity) of a light pattern projected by the optical projector, while the lens cap is engaged over the light pattern projector and as the light pattern passes through the aperture of the lens cap. The projected light pattern, for example, may be structured light or light in coded form emitted from a light source of the projector, via a masking element, and through a lens assembly.

To this extent, a light pattern projector when used along with the lens cap, allows outputting optical radiation defining the light pattern with high output power, while still meeting laser safety standards. In an aspect, the lens cap is designed to be engaged mechanically to a lens assembly of the light pattern projector by using adhesives or based on snap-fit type arrangement. In some embodiments described herein, the lens cap has a cylindrical casing shaped back portion. As mentioned, a body of the lens cap defines an elliptically shaped aperture which extends through the lens cap from the back surface of the lens cap to the front surface of the lens cap. To this extent, a cross-section of the elliptically shaped aperture taken perpendicular to a center axis of the lens cap is such that, it defines a see-through type opening, through which the light pattern defined by projected rays of light may cross through when the lens cap is mechanically engaged over the light pattern projector.

In accordance with various embodiments described herein, the elliptically shaped aperture of the lens cap is chamfered towards its periphery, as the elliptically shaped aperture extends from the back surface to the front surface of the lens cap. For example, the periphery of the elliptically shaped aperture on the back surface of the lens cap may be chamfered and/or sloped toward the center of the aperture.

This chamfered structure of the elliptically shaped aperture causes the vignetting of the light pattern, for example, the structured light as it is projected out through a lens assembly of the optical projector and further through the elliptically shaped aperture of the lens cap. Vignetting the projected light pattern causes reduction in intensity of the outermost rays of light defining a profile of the light pattern. For example, the chamfered structure causes the light intensity at edges of the light pattern to be reduced without affecting the light intensity at the center of the light pattern projected by the light pattern projector. Thus, the vignetting of the projected light pattern causes the output from the optical projector to meet the corresponding standards of laser safety.

Thus, without reducing the overall output power at which an optical projector projects a light pattern, the optical projector may be modified to provide a structured light pattern configured for projection onto a flat surface and having edges that are in accordance with laser safety standards evaluated on spherical surface. The solution provided by various embodiments of the present invention is cost-effective and simple to design, manufacture, and incorporate into the optical projector. For example, the solution provided by various embodiments of the present invention provide for the reduction in intensity of optical radiation/laser rays (particularly ones which are at periphery or corners of a projected laser beam defining a pattern) without modifying the internal structure or lens assembly of the optical projectors. Further, by using the lens cap, as described herein, particularly in imaging systems used for dimensioning objects, there is no performance degradation in terms of reduced power illumination for dimensioning of the objects, as vignetting in the light pattern is achieved at the corner regions of the light pattern such that the central portion of the light pattern is not affected or modified. Having described an example embodiment at a high level, the design of the various devices performing various example operations is provided below.

FIG. 1 schematically depicts an exemplary environment including a light pattern projector, in accordance with some embodiments described herein. In an environment, according to various embodiments described herein, a light pattern projector 100 may be configured to project a light pattern 102, in a field of view 104. In this regard, the light pattern 102 projected by the light pattern projector 100 may be in the form of structured light or coded via passage through a masking filter, to define a pattern. In one embodiment, the light pattern projector 100 may include a high-power light source, for example, a vertical-cavity surface-emitting laser (VCSEL) laser source or laser diode (not shown herein), along with a pattern masking element (not shown herein), for projecting a structured light (i.e. a pattern of light or optical radiations in coded form) on an object 106. To this extent, in accordance with various embodiments, the light pattern projector 100 may project the light pattern 102 via the light source, through a lens assembly (not shown herein) of the light pattern projector 100. In this regard, in accordance with various embodiments described herein, a lens cap may be positioned in front and mechanically engaged over the lens assembly of the light pattern projector 100 such that, the projected light pattern 102, through the lens cap assembly, passes further through an aperture of the lens cap 108.

The light pattern projector 100, as illustrated herein, may be adapted to output optical radiations (for example, a laser beam) defining the light pattern 102 with various levels of intensity based on a requirement of an illumination and/or depending upon lightning conditions in the environment.

Having described an environment including the light pattern projector 100 at a high level, various details of an example structure of the lens cap and its assembling with respect to light pattern projector 100 including its components are described in greater details, in reference to FIGS. 4-13.

Figure 2:
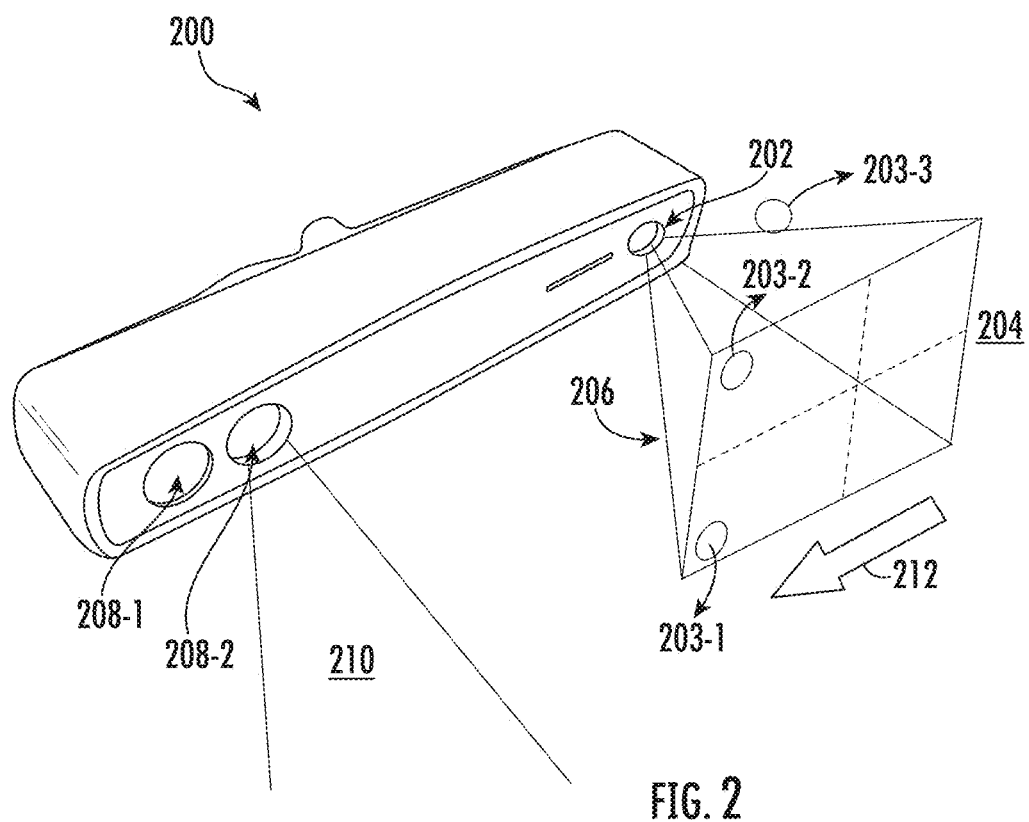
FIG. 2 schematically depicts a diagram illustrating an imaging system including a light pattern projector, in accordance with some example embodiments described herein.

FIG. 2 schematically depicts an imaging system including a light pattern projector, in accordance with some example embodiments described herein. As illustrated, in accordance with some embodiments, an imaging system 200, for example, but not limited to, an object dimensioner, may include a light pattern projector 202 for projecting a light pattern 204 in its field of view 206. In this aspect, the light pattern projector 202 may include a light source, for example, but not limited to, a laser emitter, VCSEL, or a laser diode, which emits optical radiation in the form of a laser beam formed of multiple laser rays of defined intensity. The projected laser beam from the light source may pass via one or more filters or masking elements, for example, but not limited to, a binary mask, that converts the projected laser beam into a light pattern.

In an aspect, the light pattern may represent a structured light that is projected out from a lens assembly (not shown herein) of the light pattern projector. In this aspect, the projected light pattern 204 may be defined by multiple laser rays of a defined intensity that travel out from the light pattern projector 202. To this extent, the light pattern projector 202 may be adapted to project the light pattern 204 that is distributed uniformly when the pattern 204 is incident on a surface, for example, a plane surface of an object. In an aspect, three circles marked as 203-1, 203-2, and 203-3, in front of the light pattern projector 202, are representative of peak radiations of laser rays that defines the light pattern 204. These three circles 203-1, 203-2, and 203-3 marked as peak radiations are also representative of portion of projected light rays which exceeds laser eye safety limits when the light pattern projector 202 is used in absence of a 'lens cap', described in accordance with various embodiments, hereinafter throughout the description.

As illustrated, the imaging system 200 may also include, an imaging unit that is adapted to capture images of an environment in its field of view 210. In an example embodiment, the imaging unit includes one or more camera units, such as, for example, a range camera 208-2 and a color camera 208-1, along with a processor. In this regard, in some cases, the range camera 208-2 may include, an image sensor adapted to sense a reflection of the projected light pattern 204 in its field of view 210. In some examples, the range camera 208-2 may also capture an image of an object on which the light pattern 204 may be projected, to determine depth and three-dimensional (3D) co-ordinates of various points on the object. Illustratively, in accordance with said embodiments, the light pattern 204 projected by the light pattern projector 202 may be biased (212) towards the field of view 210 of the range camera 208-2, so that the image sensor of the range camera 208-2 effectively senses the reflection of the projected light pattern 204 in its field of view.

Figure 3:
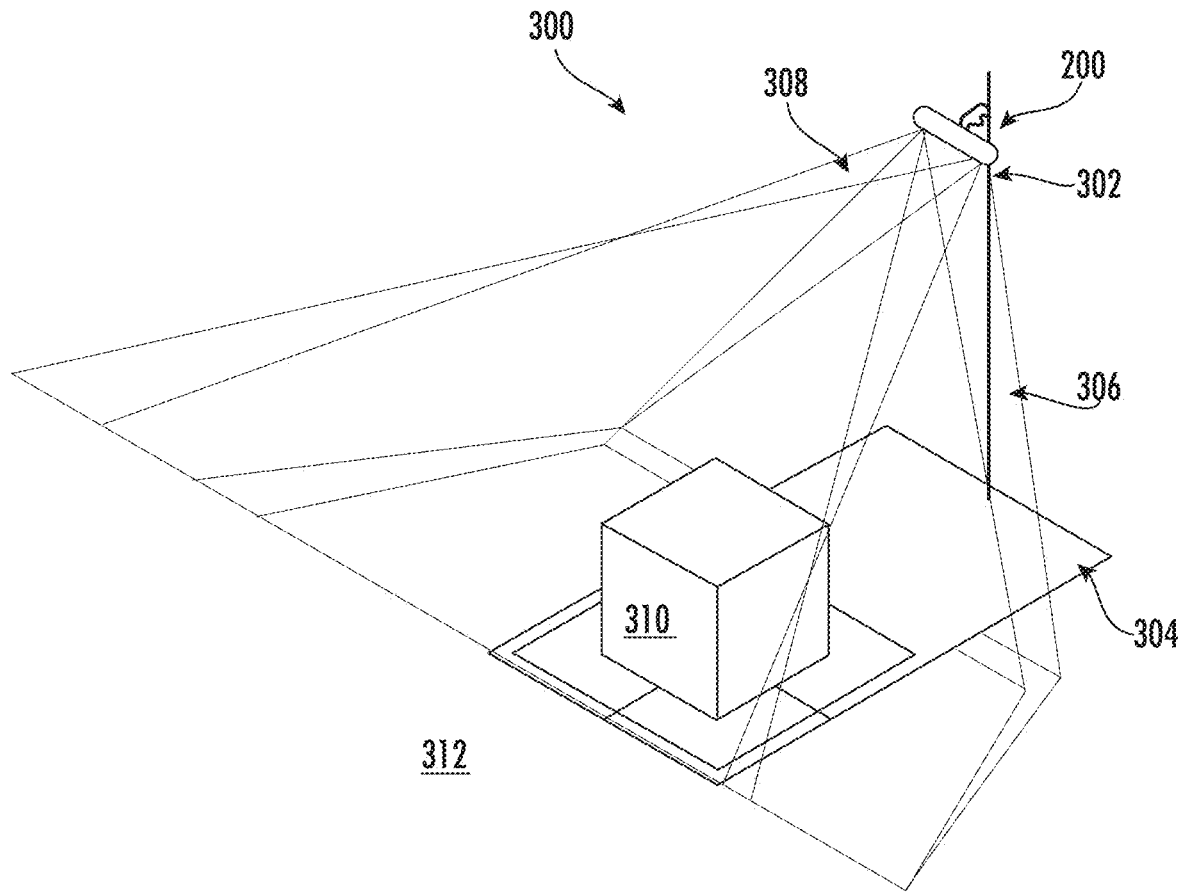
FIG. 3 illustrates an exemplary environment depicting implementation of an imaging system including the light pattern projector over which a lens cap can be mechanically engaged, in accordance with some example embodiments described herein.

FIG. 3 illustrates another exemplary environment, depicting implementation of an imaging system including the light pattern projector on which a lens cap can be mechanically engaged, in accordance with some example embodiments described herein. As illustrated, in an environment 300, for example, a material handling environment like, but not limited to, warehouses, distribution and/or shipping centers etc., may include the imaging system 200 that may be mounted on a mounting unit 302. For example, the imaging system 200 may represent a fixed mounted dimensioner device that may be mounted at a location (for instance, the mounting unit 302) above a conveyor system, in a material handling environment for measuring dimensions of packages (like cartons, boxes, consumer goods, and/or the like) as these packages pass through and are processed for transportation on the conveyor system.

Usually, in such environments, the imaging system 200 is installed at a defined height depending on various factors, for example, a range of the image sensor of the one or more cameras in the imaging system 200, or distance to a platform on which the object is to be dimensioned. To this extent, in one embodiment, the imaging system 200 may be mounted on the mounting unit 302 at such a height, for example 1.5 m from a reference surface, so that, a light pattern projector (not shown) may illuminate a surface 304 in its field of view 306, by projecting a light pattern and a camera unit (not shown) of the imaging system 200 may sense a reflection of the projected light pattern in its field of view 308. Illustratively, the light pattern may be projected on an object 310 that may be placed at a defined platform 312, for example, but not limited to, a weight scale. In this regard, the camera unit of the imaging system 200 may be initially calibrated for a reference surface, for instance, the platform 312 on which various objects are to be placed for dimensioning.

In accordance with one embodiment, the imaging system 200 may be adapted to compute dimensions of the object 310, in an instance, when the object is placed on the platform 312. In this regard, the object 310 may be positioned on the platform 312 such that a center of the object 310 is at a defined distance, for example, 1.05 m, to the imaging system 202 in the field of view 308 of its camera unit. In this aspect, to compute the dimensions of the object 310, firstly, the light pattern projecting unit of the imaging system 200 may illuminate the object 310 by projecting the light pattern (e.g., structured light) on the object 310 and secondly, the camera unit may capture an image of the object 310 along with the projected pattern to determine various 3D points on the surface of the object 310 and may further compute a range image of the object 310. Accordingly, the imaging system 200 may process the range image of the object to generate a 3D point cloud encompassing various 3D points on surfaces of the object 310. The 3D point cloud may be further processed to compute dimensions of the object 310. Further details of computing the dimensions of object using an imaging system with a light pattern projector that projects structured light on the object are described in U.S. patent application Ser. No. 16/014,851, filed Jun. 21, 2018, entitled, "METHODS, SYSTEMS, AND APPARATUSES FOR COMPUTING DIMENSIONS OF AN OBJECT USING RANGE IMAGES", the entire contents of which are incorporated by reference herein.

Figure 4:
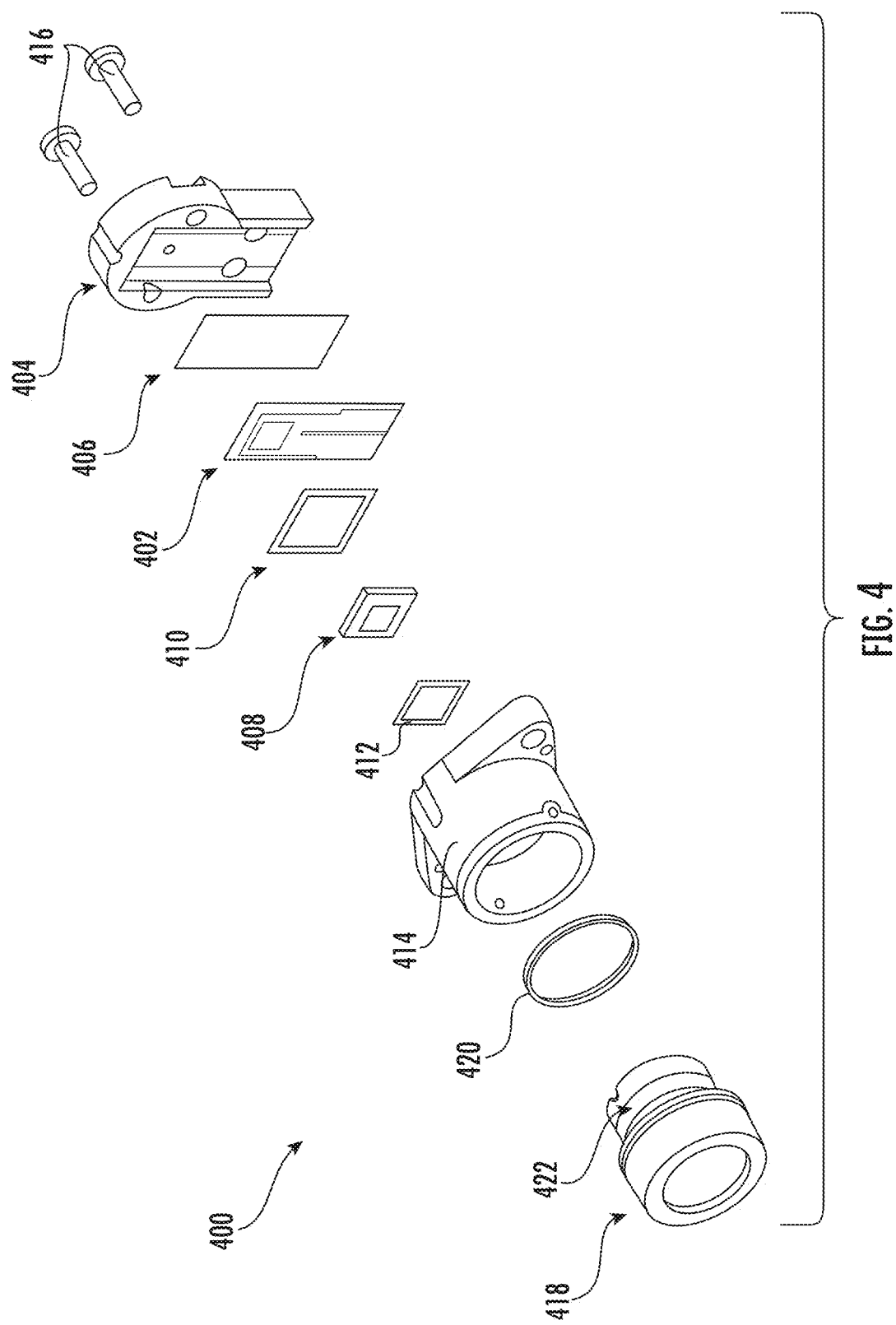
FIG. 4 schematically illustrates an exploded perspective view of the light pattern projector adapted to be mechanically engaged with a lens cap, in accordance with various example embodiments described herein.

FIG. 4 schematically illustrates an exploded perspective view of a light pattern projector 400, for example, the light pattern projectors 100 or 200 as described in reference to FIGS. 1 and 2 respectively. In various embodiments, a light pattern projector 400 is an example of an optical projector with which a lens cap of the present invention may be used and/or secured to. In this regard, the light pattern projector 400 is adapted to be mechanically engaged with a lens cap, for instance, the lens cap 108, in accordance with various example embodiments described herein. Structural details of the lens cap 108 are described in reference to FIGS. 4-9. As illustrated, the light pattern projector 400 may include a light source 402, for instance, VCSEL board having a semiconductor laser diode of vertical-cavity surface-emitting laser type. In this regard, the light source may be adapted to emit optical radiation, of varying intensity, for instance ranging from about 100 Watts/cm^2 to about 300 Watts/cm^2 with a center wavelength of 850 nm. In this aspect, in an example, the VCSEL based light source 403 may include an emitter area of 3.0 mm*2.3 mm and an application output from the VCSEL board may be from about 7 Watts to 20 Watts. In accordance with various embodiments, when assembling components of the light pattern projector 400, the light source 402 may be affixed to a projector heat sink 404 via a thermal conductive paste 406. Further, the light source 402 may be engaged to a masking element 408, for example, a pattern mask, via a VCSEL adhesive 410. The masking element 408, as illustrated, may be sandwiched between a mask adhesive 412 and the VCSEL adhesive 410. In this aspect, the masking element 408 may be adapted to convert the optical radiation (laser beam) emitted from the light source 402 into a light pattern, for instance, structured light. To this extent, in some examples, the masking element 408 may be binary pattern masks which may generate the pattern of a required energy distribution, as a laser beam generated from the light source 402, is incident on the masking element 408. Illustratively, the pattern projector 400 may include a mask holder 414, within which a configuration of the masking element 408 and the light source 402 (formed using the mask adhesive 412 and the VCSEL adhesive 410) may be recessed and affixed on the projector heat sink 404, via the thermal conductive paste 406. Further, the mask holder 414 may be adapted to be mechanically engaged with the projector heat sink 404 via one or more screws 416.

In accordance with various embodiments, the light pattern projector 400 may include a projector lens assembly 418, including a projector lens that may be engaged to the masking holder 414 via a focusing adhesive 420. In this regard, the projector lens assembly 418 may include one or more features 422 (like, but not limited to, threadings, protrusions, projections, grooves, flanges and/or the like) on its surface which enables mechanical engagement of a lens cap over the projector lens assembly 418. Further details of engagement of the lens cap over the projector lens assembly 418 are described in FIGS. 5, 7A, 7B, 8 and 9.

Figure 5:
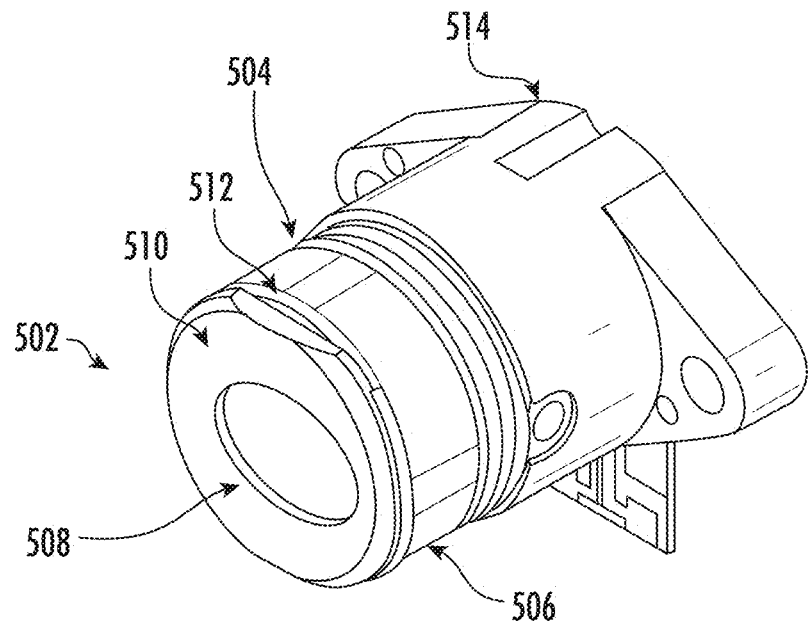
FIG. 5 schematically illustrates a perspective view of a lens cap mechanically engaged to a lens assembly of a light pattern projector, in accordance with one example embodiment described herein.

FIG. 5 schematically illustrates an arrangement 500 representing a lens cap that is mechanically engaged to a projector lens assembly of a light pattern projector, in accordance with one example embodiment described herein. As illustrated, a lens cap 502 is mechanically engaged over a projector lens assembly 504 of a light pattern projector (not shown completely herein). The projector lens assembly 504, as illustrated herein, may correspond to the projector lens assembly 418 as described in FIG. 4. The lens cap 502, in an embodiment, may be engaged or affixed over the projector lens assembly 504 using an adhesive element 506, for example, a UV adhesive, upon positioning the lens cap 502 over the projector lens assembly 504. In this regard, for engaging the lens cap 502 over the projector lens assembly 504, the lens cap 502 may be positioned over the projector lens assembly 504 such that, a bezel 510 of the lens cap 502 matches to a bezel 512 of the projector lens assembly 504. Further, as illustrated, a body of the lens cap 502 on its front surface defines an elliptically shaped aperture 508 that extends from a back surface of the lens cap 502 and to the front surface of the lens cap 502.

Figure 6:
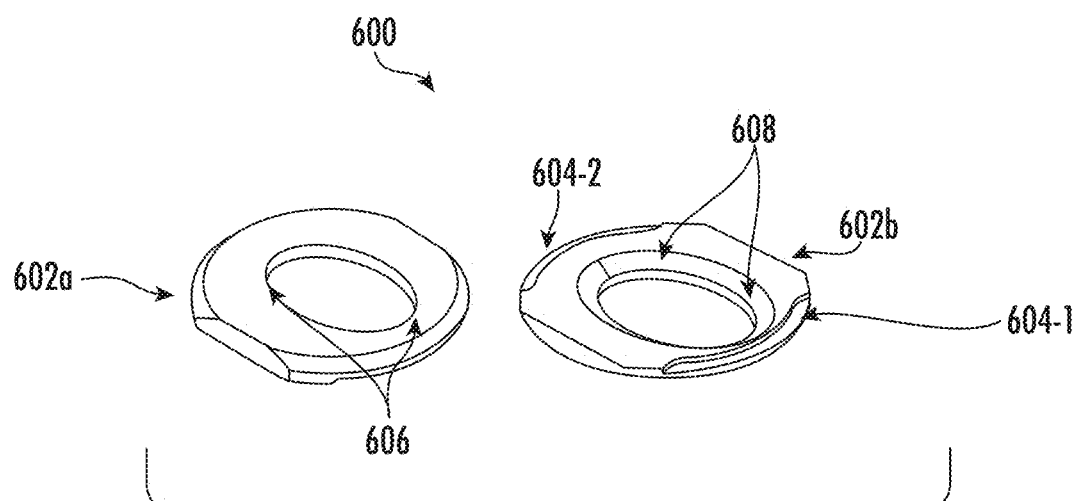
FIG. 6 schematically illustrates front and back surfaces of a lens cap, in accordance with one example embodiment described herein.

Accordingly, to engage the lens cap 502 over the projector lens assembly 504, the elliptically shaped aperture 508 of the lens cap 502 may be aligned to match an aperture defined by the bezel 512 and/or a lens of the projector lens assembly 504. Also, in accordance with said embodiment, the lens cap 502 may be mechanically disengaged from the projector lens assembly 504 (refer to lens cap as illustrated in FIG. 6), based on removing the adhesive element 506 and pulling of the lens cap 502. As illustrated, the projector lens assembly 504 may be a part of a light pattern projector unit, similar to light pattern projector 400, as illustrated in FIG. 4. To this extent, the projector lens assembly 504 may be engaged within a housing formed by a masking holder 514, similar to the masking holder 404 as described in FIG. 4.

In accordance with various embodiments described herein, the lens cap 502 may be mechanically engaged over the projector lens assembly 504 such that, the light pattern projected out from a lens of the projector lens assembly 504 passes through the elliptically shaped aperture 508 of the lens cap 502. Further details of a path of optical radiation, i.e. laser beam and/or light pattern as projected from a light pattern projector, via the projector lens assembly 504 and through the lens cap 502 is described in reference to FIGS. 14A-E.

FIG. 6 schematically illustrates front and back surfaces of a lens cap, in accordance with one example embodiment described herein. As illustrated, a lens cap 600 (similar to the lens cap 502 as illustrated in FIG. 5) includes a front surface 602a and a back surface 602b. In this regard, the back surface 602b is adapted to be engaged mechanically over a surface of a light pattern projector, for instance, over the projector lens assembly 504 using the adhesive element 506 (as illustrated in FIG. 5). To this extent, the back surface 602b of the lens cap 600 may be of a shape complimentary to a bezel surface of the projector lens assembly 504, so that upon engaging the lens cap 600 over the projector lens assembly 504, the back surface 602b is mechanically engaged and/or secured over the projector lens assembly 504 by support of the adhesive element 506. In this regard, in accordance with some embodiments, the back surface 602b of the lens cap 600 may also include adhesive slots 604-1 and 604-2 over which the adhesive element 506, such as UV adhesive may be applied for fixing the lens cap 600 over the lens cap assembly 504. In various embodiments, the adhesive slots 604-1 and 604-2 may be configured to align with corresponding bezels of the projector lens assembly 504 such that the major axis (or the minor axis in one embodiment) of the elliptically shaped aperture 508 is aligned with an axis of the light projector that is parallel to a line defined the light pattern projecting unit 400 and the camera units 208.

In accordance with various embodiments described herein, a body of the lens cap 600 including the front surface 602a of the lens cap 600 defines an elliptically shaped aperture 606 which extends from the front surface 602a through to the back surface 602b of the lens cap 600, thereby creating a see-through type elliptical opening through the body of the lens cap 600. In this regard, a periphery of the elliptically shaped aperture 606 is chamfered 608 as the periphery of the elliptically shaped aperture 606 extends out from the back surface 602b to the front surface 602a of the lens cap 600. In this aspect, a slope of the chamfered 608 portion of the elliptically shaped aperture 606 may be defined based on at least one of: (i) an axial distance between a surface of the lens assembly, (for example, the projector lens assembly 418 of the light pattern projecting unit 400 as illustrated in FIG. 4) and the back surface 602b of the lens cap 600 and (ii) a desired corner reduction ratio (e.g., to what extent and/or severity the edges and/or corner of the light pattern is to be vignetted and/or reduced).

In this aspect, in an instance while the lens cap 600 is mechanically engaged over the lens assembly (like the projector lens assembly 418) light emitted from a light source (for example, the light source 402) is projected out as a light pattern or structured light, from the projector lens assembly 418 of the light pattern projector 400. The projected light pattern further travels to pass through the elliptically shaped aperture 606 of the lens cap 600. In this regard, a desired corner reduction ratio may represent a percentage decrease in intensity of outermost rays of a laser beam defining the projected light pattern, as the light pattern is projected out from the elliptically shaped aperture 606 of the lens cap 600. In this aspect, the decrease in the intensity of the outermost rays of light defining the light pattern is based on blocking portions of these rays, as these rays pass along the chamfered 608 portion at the periphery of the elliptically shaped aperture 606. Thus, a slope of the chamfered periphery of the elliptically shaped aperture 606 causes vignetting of the outermost rays of projected laser beam defining the projected pattern, details of which are further described in reference to FIGS. 11A, 11B, 12A, and 12B.

Figure 7A:
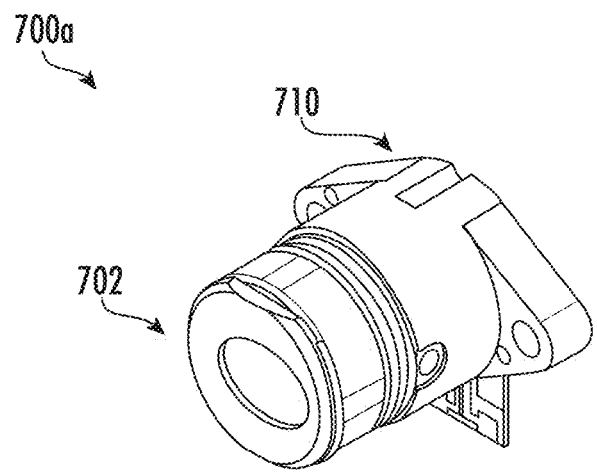
FIG. 7A schematically illustrates an arrangement representing a lens cap having a cylindrically shaped back casing, where the lens cap is mechanically engaged to a lens assembly of a light pattern projector, in accordance with another example embodiment described herein.
Figure 7B:
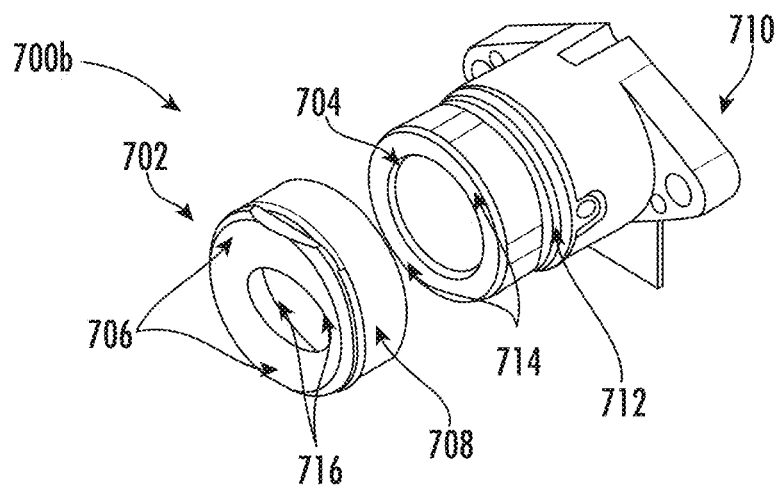
FIG. 7B schematically illustrates an arrangement representing the lens cap having the cylindrically shaped back casing, where the lens cap is mechanically dis-engaged from the lens assembly of the light pattern projector, in accordance with another example embodiment described herein.

In various embodiments, the lens cap 108 comprises an aperture plate having the elliptically shaped aperture 606 there-through. In various embodiments, the aperture plate is circular, elliptical, a circle cut along one or more chords, and/or another shape. In various embodiments, the lens cap 108 further comprises a cylindrically shaped back casing. For example, FIG. 7A schematically illustrates another embodiment, representing an arrangement 700a of a lens cap 702 having a cylindrically shaped back casing. As illustrated, the lens cap 702 is mechanically engaged over a projector lens assembly 704 of a light pattern projector (not shown herein). FIG. 7B schematically illustrates, an arrangement 700b representing the lens cap 702 that is mechanically dis-engaged to the projector lens assembly 704, in accordance with another example embodiment described herein. The projector lens assembly 704, as illustrated herein, may correspond to a portion of a housing formed by a masking holder 710 (similar to the masking holder 404 as illustrated in FIG. 4 that includes various components of the light pattern projector 400). Unlike the lens cap 502 and 600 as illustrated in FIGS. 5 and 6 respectively, the lens cap 702 as illustrated in FIGS. 7A and 7B, includes a back portion that extends outwards from a front surface 706 of the lens cap, thereby defining a cylindrically shaped casing 708. In this aspect, while engaging the lens cap 702 over the projector lens assembly 704, the cylindrically shaped casing 708 may recess an aperture 714 of the projector lens assembly 704. To this extent, the cylindrically shaped casing 708 may be mechanically engaged over the projector lens assembly 704 based on one or more features present on the projector lens assembly. For example, in one example, the projector lens assembly 704 on its surface may include one or more spiral threadings 712 which may facilitate engagement of the lens cap 702 over the projector lens assembly 704. In this regard, the cylindrically shaped casing 708 of the lens cap on its internal surface may include threadings of shape complimentary to the threadings 712, so that the lens cap 702 may be fastened over the aperture 714 of the projector lens assembly 704.

In another embodiment, the lens cap 702 may be engaged over the aperture 714 of the projector lens assembly 704, based on a snap fit arrangement. In this regard, the cylindrically shaped casing 708 of the lens cap 702 may include, on its internal lateral surface, one or more flanges, protrusions, or grooves (see e.g., FIG. 13). Accordingly, the aperture 714 of the projector lens assembly 704 may include features of complimentary shape, i.e. one or more flanges, protrusions, or grooves respectively, for mechanically engaging the lens cap 702 over the projector lens assembly 704 in a snap-fit manner and in an appropriate alignment with respect to the projector lens assembly 704. Alternatively, in another embodiment, the lens cap 702 may be affixed over the projector lens assembly 704 by fastening the cylindrically shaped casing 708 of the lens cap 702 over the aperture 714 while an adhesive is applied over the aperture 714.

In accordance with said embodiment, similar to the elliptically shaped aperture 508 and 606, as described in reference to FIGS. 5 and 6 respectively, a body of the lens cap 702 also includes an elliptically shaped aperture 716 such that, a periphery of the elliptically shaped aperture 716 is chamfered, as the periphery of the elliptically shaped aperture 716 extends out from a back surface to a front surface of the lens cap 702. Further, details pertaining to the chamfered portion of the elliptically shaped aperture 716 are described in reference to FIG. 10.

Figure 8:
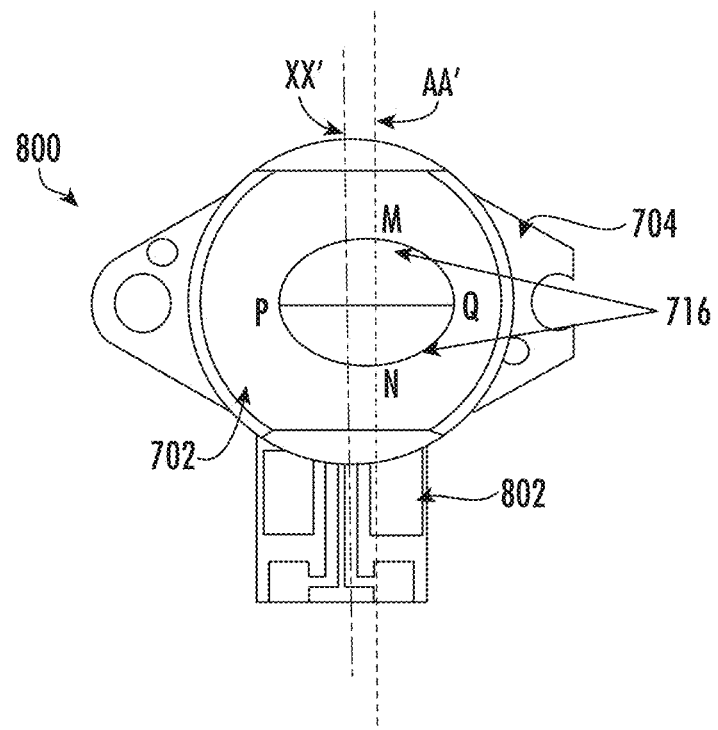
FIG. 8 schematically illustrates front view of the lens cap mechanically engaged over the lens assembly of the light pattern projector, in accordance with another example embodiment described herein.

FIG. 8, in reference with FIGS. 7A and 7B, schematically illustrates a front view of an arrangement 800 depicting the lens cap 702 mechanically engaged over the projector lens assembly 704 of a light pattern projector, in accordance with another example embodiment described herein. As illustrated from the front view of an engagement of the lens cap 702 over the projector lens assembly 704, the lens cap 702 on its front surface defines an elliptically shaped aperture 716. The elliptically shaped aperture 716, as illustrated herein, is engaged over the projector lens assembly 704 in such a manner, that a cross-section of the elliptically shaped aperture 716 taken perpendicular to a central axis of the lens cap 702 (e.g., the size and/or shape of the elliptically shaped aperture 716) is adapted to match a field of view of the light pattern projector and further to an aperture of the projector lens assembly 704, as the lens cap 702 is mechanically engaged over the projector lens assembly 704. In accordance with various embodiments, the lens cap 702 herein may also correspond to the lens cap 502 as illustrated in FIG. 5.

Illustratively, the elliptically shaped aperture 716 may be defined on at least a portion of the front surface of the lens cap 702 such that, a center axis AA' that passes orthogonally through the front surface and the back surface of the lens cap 702, and via a point of intersection of a major axis PQ and a minor axis MN of the elliptically shaped aperture 716 is spatially offset from a central axis XX' of the lens cap 702. In this aspect, in accordance with some embodiments, a length of the major axis PQ and a length of the minor axis MN, of the elliptically shaped aperture 716 is based on a defined value to which a light pattern projector including the projector lens assembly 704 projects a light pattern that is offset from a center axis of a lens of the projector lens assembly 704. Illustratively, the projector lens assembly 704 along with its housing may include various components on a printed circuit board (PCB) arrangement 802 like a light source, a masking element, a heat sink, etc. (like components 404-420 as illustrated and described in FIG. 4) of an optical projector. The projector lens assembly 704 may be configured to provide a light pattern that is centered at a point that is offset from the center axis of the lens of the projector lens assembly 704 such that the light pattern is provided in the field of view of associated imaging units. The point of intersection of the major axis PQ and the minor axis MN of the elliptically shaped aperture 716 is similarly spatially offset from the central axis XX' of the lens cap 702.

Figure 9:
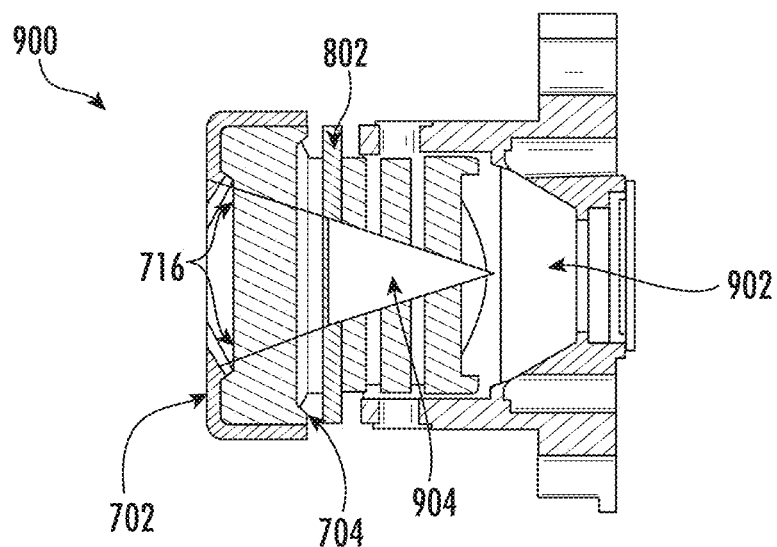
FIG. 9 illustrates a side view of the lens cap mechanically engaged over the projector lens assembly of the light pattern projector, in accordance with some example embodiments described herein.

FIG. 9, in reference to FIGS. 7A and 7B, illustrates a side view 900 of the lens cap 702 mechanically engaged over the projector lens assembly 704 of the light pattern projector 710, as described in reference to FIG. 7. As illustrated, the lens cap 702 defines the elliptically shaped aperture 716 that is chamfered towards a periphery defined by elliptical ends of the aperture. In accordance with some embodiments, in operation, while the lens cap 702 is engaged over the projector lens assembly 704, the elliptically shaped aperture 716 may be adapted to at least block or partially block the outermost rays (e.g., the light rays that are at periphery of a projected laser beam 904 defining the light pattern as generated by a light source 902 and projected from the projector lens assembly 704) from passing through the elliptically shaped aperture 716 of the lens cap 702. For example, the elliptically shaped aperture 716 and the chamfered periphery and/or edge thereof may be configured to cause a vignetting effect on the light pattern. In an example embodiment, a vignetting effect is a softening or reducing in the intensity of light pattern about the periphery or edges of the light pattern.

Figure 10:
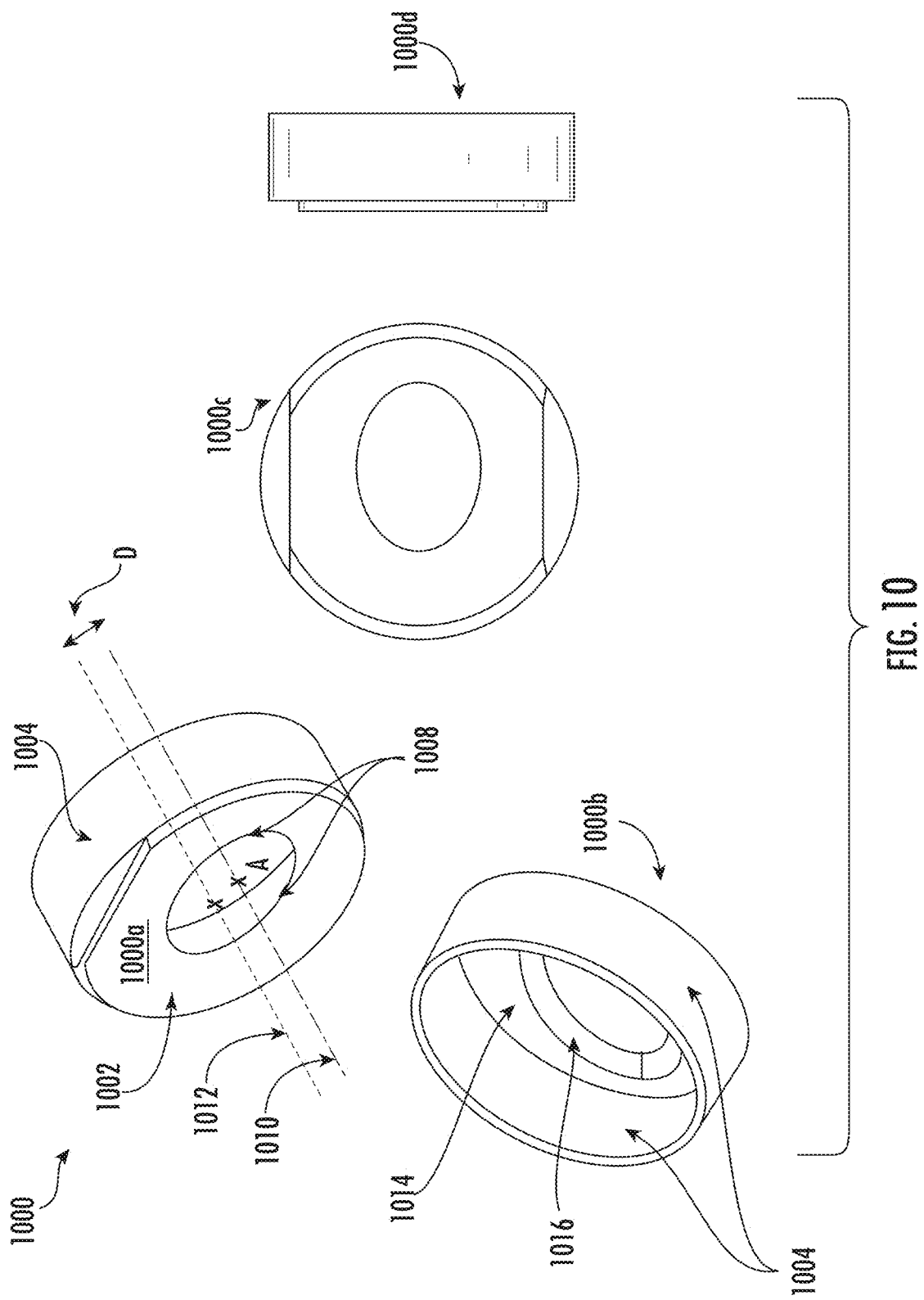
FIG. 10 illustrates multiple perspective views of the lens cap, representing different surfaces of the lens cap having the cylindrically shaped back casing, in accordance with some embodiments described herein.

FIG. 10 schematically illustrates multiple views 1000a, 1000b, 1000c, and 1000d, representing different surfaces of a lens cap 1000, in accordance with various embodiments described herein. As illustrated, 1000a represents a perspective view of a front body the lens cap 1000, depicting a front surface 1002 of the lens cap 1000 and a cylindrically shaped casing 1004 of the lens cap 1000 that extends out and/or backwards from the front surface 1002 of the lens cap 1000, thereby forming a back portion of the lens cap 1000. As illustrated, a portion of the front surface 10002, defines an opening in the form of an elliptically shaped aperture 1008 that extends from a back surface of the lens cap 1000 through the front surface 1002 of the lens cap 1000 thereby forming a see-through type opening. As illustrated, an aperture of the elliptically shaped aperture 1008 through the lens cap 1000 is such that, a center axis 1010 of the elliptically shaped aperture 1008 is offset by a distance 'D' to a central axis 1012 of the lens cap 1000. In this regard, the center axis 1010 of the elliptically shaped aperture 1008 of the lens cap 1000 represents an axis passing orthogonally through the front surface 1002 and the back surface (refer to 1014 in view 1000b) of the lens cap 1000 and passing through a point of intersection 'A' of a major axis and minor axis of the elliptically shaped aperture 1008. The central axis 1012 of the lens cap 1000 here represents an axis passing orthogonally through the front surface 1002 and the back surface 1014 the lens cap 1000 via point of center of the lens cap 1000. For example, if the lens cap 1000 is circularly shaped, the central axis 1012 is an axis passing through a point of intersection of two diameters drawn on the circular shape of the lens cap 1000.

In accordance with various embodiments described herein, the elliptically shaped aperture 1008 is of a shape that is adapted to match a field of view of the light pattern projector (e.g., the light pattern projector 400 as illustrated in FIG. 4) with the lens cap 1000 is mechanically engaged over a lens assembly of the projector (e.g., the lens assembly 412 as illustrated in FIG. 4). To this extent, an offset D of the center axis 1010 and the central axis 1012 of the lens cap is defined based on an offset at which the light pattern projector projects a light pattern or a structured light.

As illustrated, 1000b represents a perspective view of the lens cap 1000 having a back surface 1014 and the cylindrically shaped casing 1004 that extends out and/or back from the front surface 1002 of the lens cap 1000. In this regard, in accordance with some embodiments described herein, the back surface 1014 and the cylindrically shaped casing 1004 of the lens cap 1000 together represent a back portion of the lens cap 1000. As illustrated, a periphery of the elliptically shaped aperture 1008 is chamfered 1016 as the elliptically shaped aperture 1008 extends out from the back surface 1014 to the front surface 1002 of the lens cap. In this regard, the periphery of the elliptically shaped aperture 1008 is chamfered for a defined slope depending on various factors. In this aspect, in accordance with various embodiments described herein, the slope of the chamfered 1016 along the periphery of the elliptically shaped aperture 1008 is defined based on an axial distance between the back surface 1014 of the lens cap 1000 to the lens assembly of the light pattern projector when the lens cap 1000 is mechanically engaged over the light pattern projector. For example, the slope of the chamfering 1016 of the periphery of the elliptically shaped aperture 1008 is designed and/or determined based on the expected and/or designed distance between the back surface 1014 of the lens cap 1000 and the lens assembly of the light pattern projector. Alternatively, or additionally, the slope may be defined based on a desired 'corner reduction ratio' that is representative of a desired percentage decrease, in intensity of the outermost rays and/or edges of a projected light pattern.

As illustrated, view 1000c represents a front view of the lens cap 1000 having the elliptically shaped aperture 1008 defined on the front surface 1002 of the lens cap and 1000d represents a side view of the lens cap 1000 representing a portion of the cylindrically shaped casing 1004 of the lens cap 1000 that extends out and/or back from the front surface 1002 of the lens cap 1000.

Figure 11A:
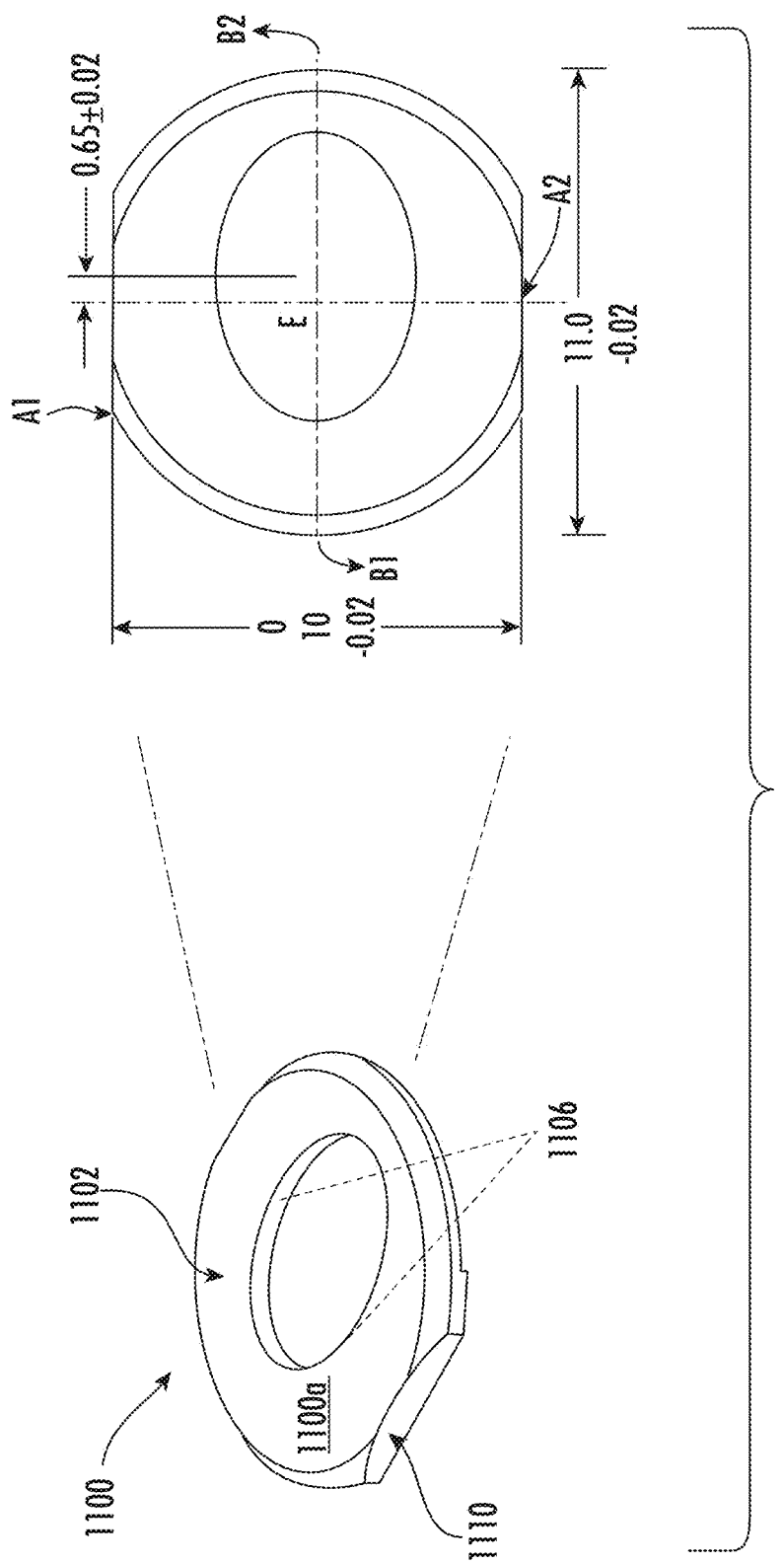
FIGS. 11A and 11B illustrates structures of front surface and back surface of the lens cap, in accordance with one example embodiment described herein.
Figure 11B:
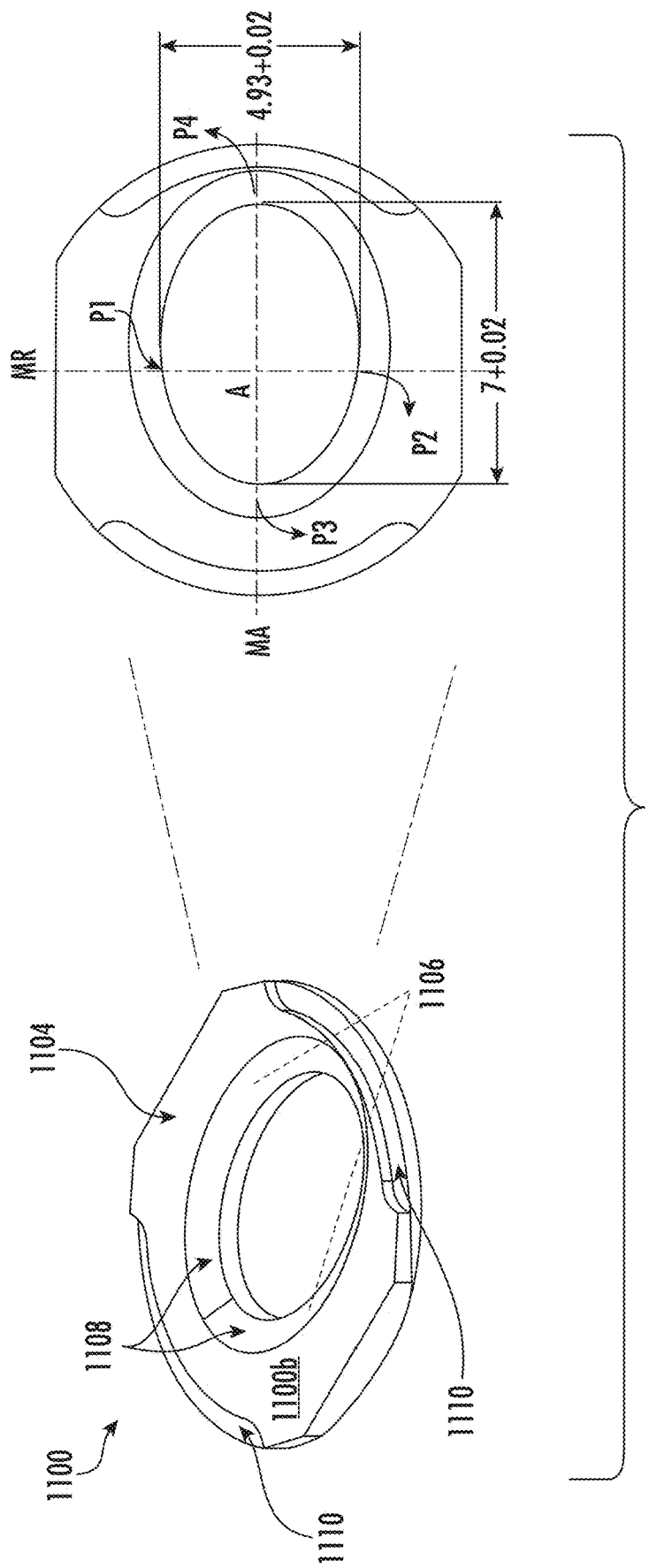

FIGS. 11A and 11B schematically illustrates structures of a front surface and back surface respectively of a lens cap 1100, in accordance with some example embodiments as described herein. Referring to FIGS. 11A and 11B, as illustrated, 1100a represents a front view of the lens cap 1100 and 1100b represents a back view of the lens cap 1100. In this aspect, from the front view 1100a of the lens cap 1100, a front surface 1102 of the lens cap 1100 and from the back view 1100b of the lens cap, a back surface 1104, is illustrated. In various embodiments, a portion of the front surface 1102 defines an elliptically shaped aperture 1106 which extends from the back surface 1104 through the front surface 1102 of the lens cap 1100, thereby forming a see-through hollow opening. In this regard, the elliptically shaped aperture 1106 of the lens cap 1100 is chamfered (towards its periphery) 1108 to a defined slope, about its periphery as the elliptically shaped aperture 1106 extends out from the back surface 1104 to the front surface 1102 of the lens cap 1100. To this extent, in accordance with one embodiment, as illustrated, a distance between two farthest points (P1 and P2) defined along a minor axis 'MR' of the elliptically shaped aperture 1106 may be in a range 4.93+/−0.02 millimeters (mm), i.e. from about 4.91 mm to about 4.95 mm. Further, as illustrated, in accordance with said embodiment, a distance between two farthest points (P3 and P4) defined along the major axis 'MA' of the elliptically shaped aperture 1106 may be in a range 7.00+/−0.02 mm, i.e. from about 6.98 mm to about 7.02 mm. In this regard, in accordance with various embodiments described herein, the distance between the points P1 and P2 and the distance between the points P3 and P4 may be larger or smaller than these values, as appropriate for the application. In an example embodiment, the offset value 'D' (referring to FIG. 10) representing an offset between a center axis (for example the center axis 1010) of the elliptically shaped aperture and a central axis (for example, 1012) of the lens cap 1100 may be about 0.65+/−0.02 mm, i.e. from 0.63 to about 0.67 mm. Various other offset values 'D' may be used in various embodiments, as appropriate for the applications. The offset 'D' as mention herein, may also represent an offset at which the light pattern is projected from the light pattern projector, from a center axis or focus of a light source, of the light pattern projector (e.g., the light pattern projector 400 as illustrated in FIG. 4).

In various embodiments, the back surface 1104 may comprise alignment grooves 1110 configured to aiding in the alignment of the lens cap 1100 with the lens assembly. For example, the alignment grooves 1110 may be configured to aid in properly aligning the cylindrically shaped aperture 1106 with the lens assembly, the light pattern projected by the light pattern projector and/or the like. For example, the alignment grooves 1110 may be configured to mate and/or engage with corresponding grooves on the housing of the lens assembly such that, when the alignment grooves and the corresponding grooves on the housing of the lens assembly are mated and/or engaged, the cylindrically shaped aperture 1106 is aligned with the lens assembly to provide the desired vignetting effect.

Figure 12A:
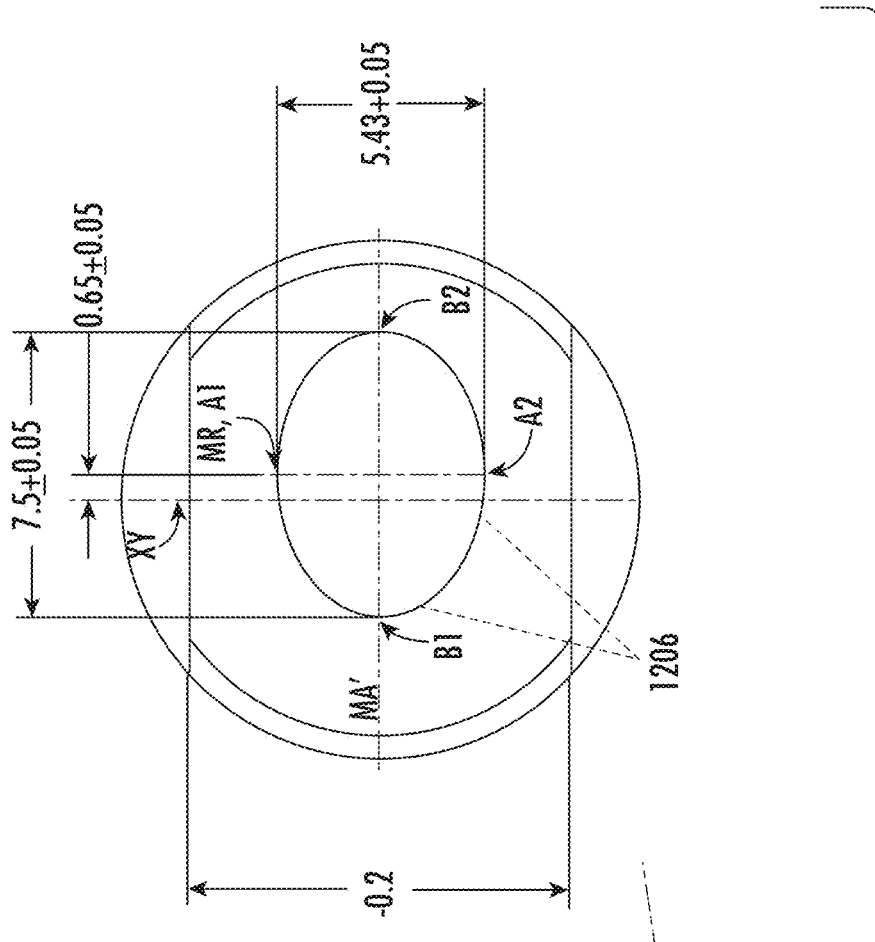
Figure 12A:
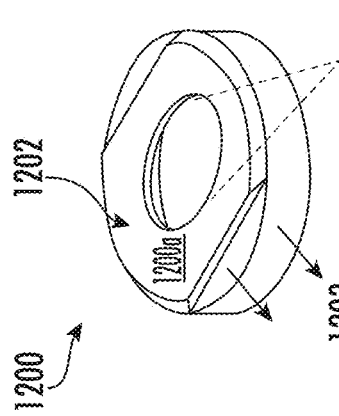
Figure 12B:
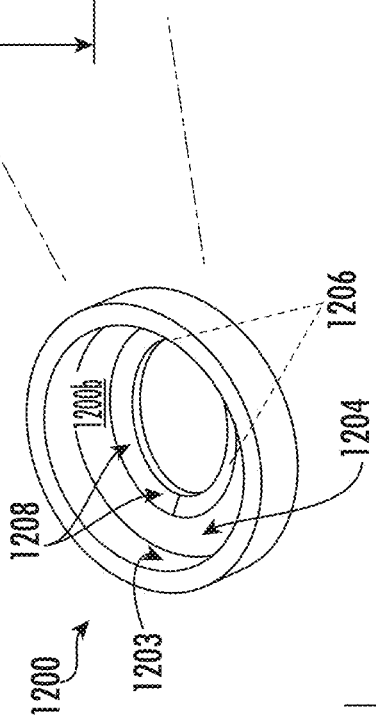

FIGS. 12A and 12B schematically illustrates structures of a front surface and back surface respectively of a lens cap 1200 having a cylindrical casing shaped back portion, in accordance with some example embodiments as described herein. Referring to FIGS. 12A and 12B, as illustrated, 1200a represents a front view of the lens cap 1200 and 1200b represents a back view of the lens cap 1200. In this aspect, from the front view 1200a of the lens cap 1200, a front surface 1202 of the lens cap 1100 and from the back view 1200b of the lens cap, a back surface 1204, is illustrated. Illustratively, the lens cap 1200 includes a cylindrically shaped casing 1203 that extends orthogonally outwards and/or back from the front surface 1202 towards a back side of the lens cap 1200. In this aspect, the back surface 1204 along with the cylindrically shaped casing 1203 defines a back portion of the lens cap 1200. According to various embodiments, the structure of the lens cap 1200 may be correspondingly similar to a structure of the lens cap 1000 as described in reference to FIG. 10.

As illustrated, a portion of the front surface 1202 defines an elliptically shaped aperture 1206 which extends from the back surface 1204 to the front surface 1202 of the lens cap 1000, thereby forming a see-through hollow opening. In this regard, the elliptically shaped aperture 1206 of the lens cap 1200 is chamfered 1208 to a defined slope, about its periphery, as the aperture 1206 extends through from the back surface 1204 to the front surface 1202 of the lens cap 1200. To this extent, in accordance with one embodiment, as illustrated, a distance between two farthest points (A1 and A2) defined along a minor axis 'MR' of the elliptically shaped aperture 1206 may be in a range 5.43+/−0.05 millimeters (mm), i.e. from about 5.38 mm to about 5.48 mm. Further, as illustrated, in accordance with said embodiment, a distance between two farthest points (B1 and B2) defined along the major axis 'MA' of the elliptically shaped aperture 1206 may be in a range 7.50+/−0.05 mm, i.e. from about 7.45 mm to about 7.55 mm. In this regard, in various embodiments, the distance between the points A1 and A2 and the distance between the points B1 and B2 may be of various ranges, as appropriate for the application (e.g., based on the field of view of the imaging units, distance to an object to be imaged, the light pattern, and/or the like). In an example embodiment, the offset value 'D' (referring to FIG. 10) representing an offset between a center axis (for example the center axis 1010) of the elliptically shaped aperture 1206 and a central axis XY of the lens cap 1200 may be about 0.65+/−0.02 mm, i.e. from 0.63 to about 0.67 mm. Various other offset values 'D' may be used in various embodiments, as appropriate for the applications. The offset 'D' as mention herein, may also represent an offset at which the light pattern is projected from the light pattern projector, from a center axis or focus of a light source, of the light pattern projector (e.g., the light pattern projector 400 as illustrated in FIG. 4). Further details related to projecting the light pattern with an offset is described in FIGS. 14A-14E.

FIG. 12C schematically illustrates a side view 1200c of the lens cap 1200 having the cylindrically shaped casing 1203 that extends from a front surface 1202 of the lens cap 1200. As illustrated, in accordance with some example embodiments, a width of the front surface 1202 as it extends from a portion of the cylindrically shaped casing 1203 may be of about 0.5 mm.

FIG. 13 schematically illustrates use of alignment features for mechanically engaging a lens cap over a lens assembly of a light pattern projector, in accordance with some embodiments described herein. In particular, proper alignment of the elliptically shaped aperture of the lens cap with the light pattern projected by the light pattern projector allows the lens cap to effectively reduce the intensity of the light pattern about the edges and/or periphery of the light pattern without diminishing the efficacy of the light pattern for the application (e.g., dimensioning objects and/or the like). Illustratively, an arrangement 1300 includes, a lens cap 1302 that is mechanically engaged over a lens assembly 1304 of an optical projector (for example, the light pattern projector 400 as described in FIG. 4). In this regard, an alignment feature assembly 1306, as illustrated herein, may be used for mechanically engaging the lens cap 1302 over an aperture 1308 of the lens assembly 1304. To this extent, the alignment feature assembly 1306 may include one or more features 1310, like, but not limited to, flanges, projections, bezels, or grooves, as illustrated herein, that may be adapted to hold the lens cap 1302 and further align an aperture, for instance, the elliptically shaped aperture 1106 as illustrated in FIG. 11A or 11B, of the lens cap 1100 with an aperture, light path, and/or field of view defined by a lens of the lens assembly 1304. The one or more features 1310, in this regard, may also be adapted to facilitate the lens cap 1302 to be recessed within a seat defined by a housing of the alignment feature assembly 1306. In an example embodiment, the alignment feature assembly 1306 is used to secure the lens cap 1302 to the lens assembly 1304 (e.g., over the aperture 1308) with appropriate alignment of the cylindrically shaped aperture of the lens cap 1302 with the lens assembly 1304, field of view of the light pattern projector, the light pattern projected by the light pattern projector, and/or the like. In an example embodiment, after the lens cap 1302 has been secured to the lens assembly 1304 with the appropriate alignment, the alignment feature assembly 1306 is removed.

Illustratively, the alignment feature assembly 1306 has two faces, i.e. a front face A and a back-face B. In this aspect, for engaging the lens cap 1302 over the lens assembly 1304, the lens cap 1302 may be recessed through a first surface into an aperture 1312 defined by the housing of the alignment feature assembly 1306. As the lens cap is seated or recessed into the aperture 1312, the alignment feature assembly 1306 including the lens cap 1302 may be engaged mechanically over the aperture 1308 of the lens assembly 1304 such that, a surface of the lens assembly 1304 defining the aperture 1308 mates with the back-surface B of the alignment feature assembly 1306. Further, the alignment feature assembly 1306 may be rotated either clockwise or anti-clockwise, for snapping-on or sealing-up the lens cap 1302 over the aperture 1308 of the lens assembly 1304 and for aligning apertures of the lens cap 1302 and the lens assembly 1304 respectively. In accordance with some embodiments, an arrangement including a thread engagement may be defined on one or more of (a) lens cap 1302, (b) the alignment feature assembly 1306, and/or (c) the aperture 1308 of the lens assembly 1304, for mechanically loading the lens cap 1302 over the lens assembly 1304. To this extent, the aperture 1308 of the lens assembly 1304 may include, one or more threadings 1314 along with threadings on at least one of the lens cap 1302 and the alignment feature assembly 1306 that compliments the threadings on the aperture 1308, for mechanically engaging the lens cap 1302 over the lens assembly 1304. Additionally, or alternatively, in accordance with various embodiments described herein, the alignment feature assembly 1306 may also be adapted for aligning apertures (for instance, the elliptically shaped apertures 1106 and 1206, as illustrated and described in FIGS. 11A, 11B, 12A, and 12B) of the lens cap 1302 with the aperture 1308 of the lens assembly 1304.

Figure 14A:
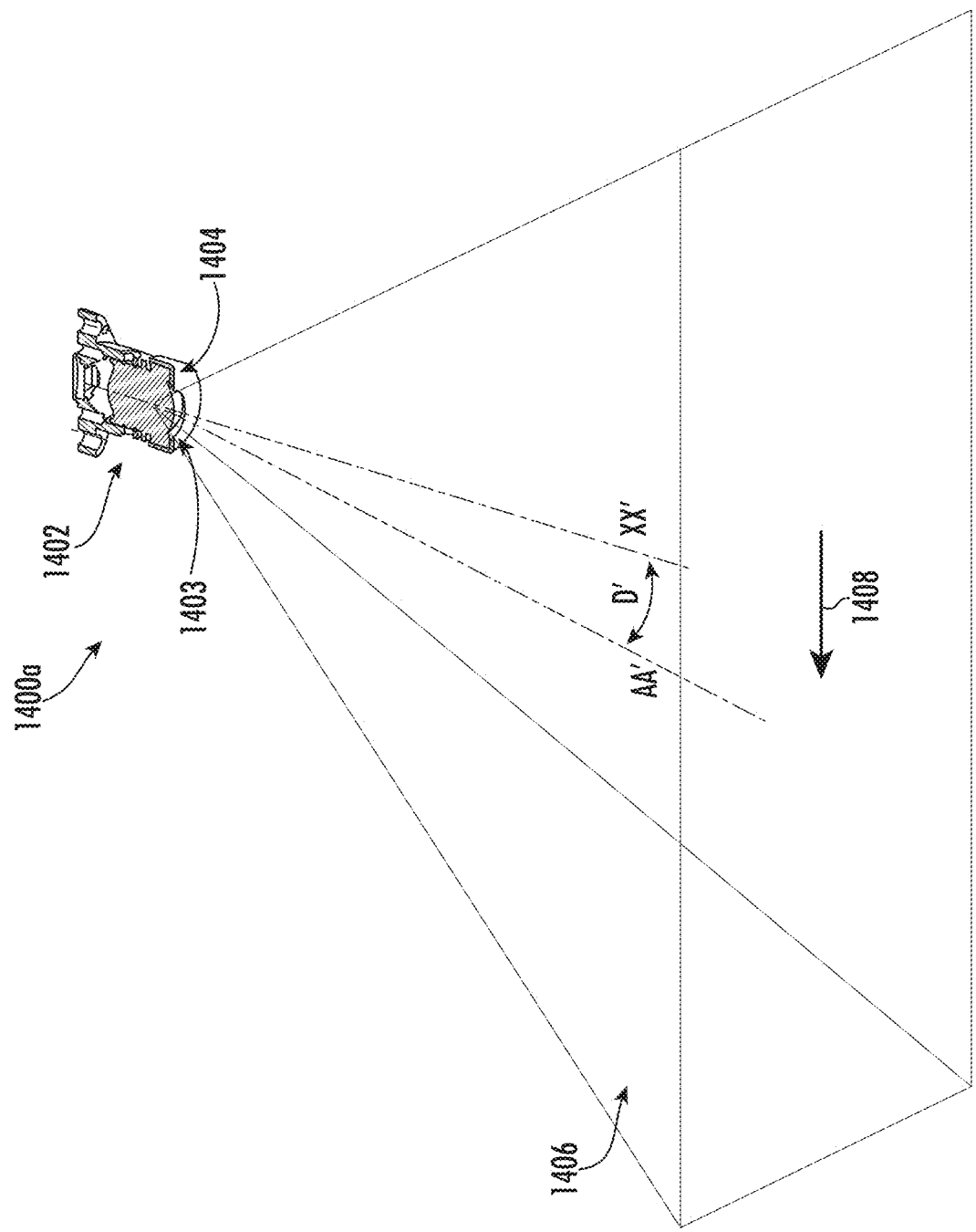
FIGS. 14A-14B schematically illustrates multiple cutaway perspective views of a light pattern projector having lens cap mechanically engaged over a lens assembly of the projector, where the light pattern projector is adapted to project a light pattern that is spatially offset in one direction, in accordance with some embodiments described herein.
Figure 14B:
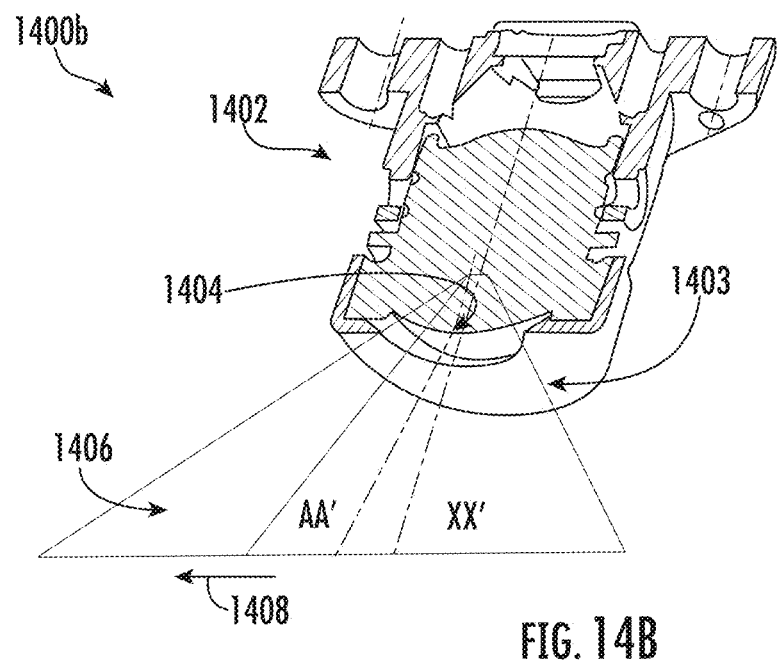
Figure 14C:
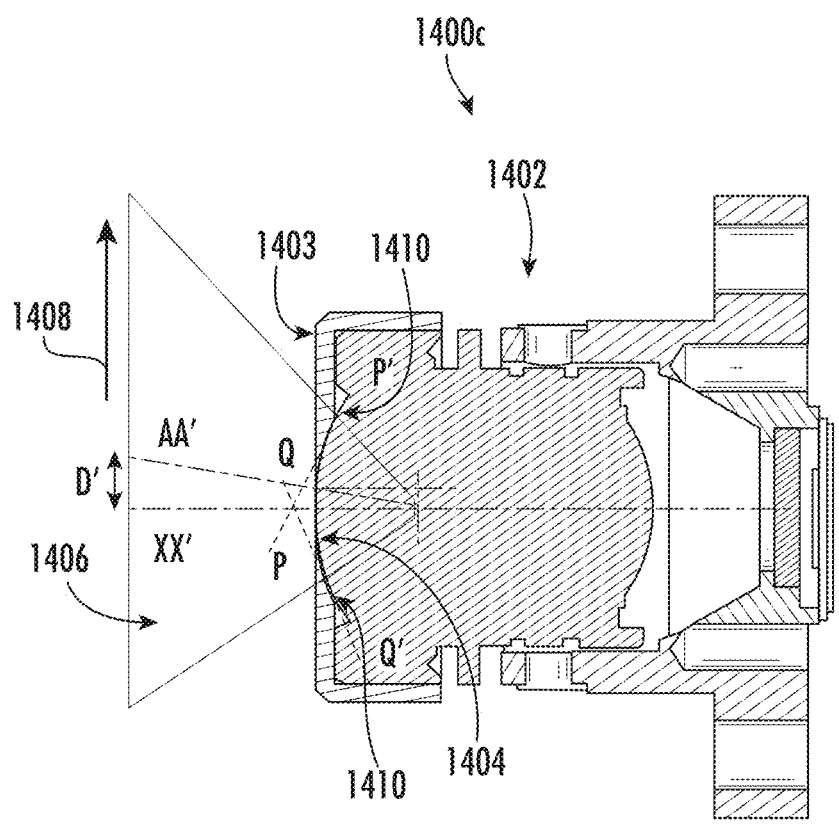
FIG. 14C schematically illustrates a side view of a light pattern projector having lens cap mechanically engaged over a lens assembly of the projector, where the light pattern projector is adapted to project a light pattern that is spatially offset in one direction, in accordance with some embodiments described herein.
Figure 14E:
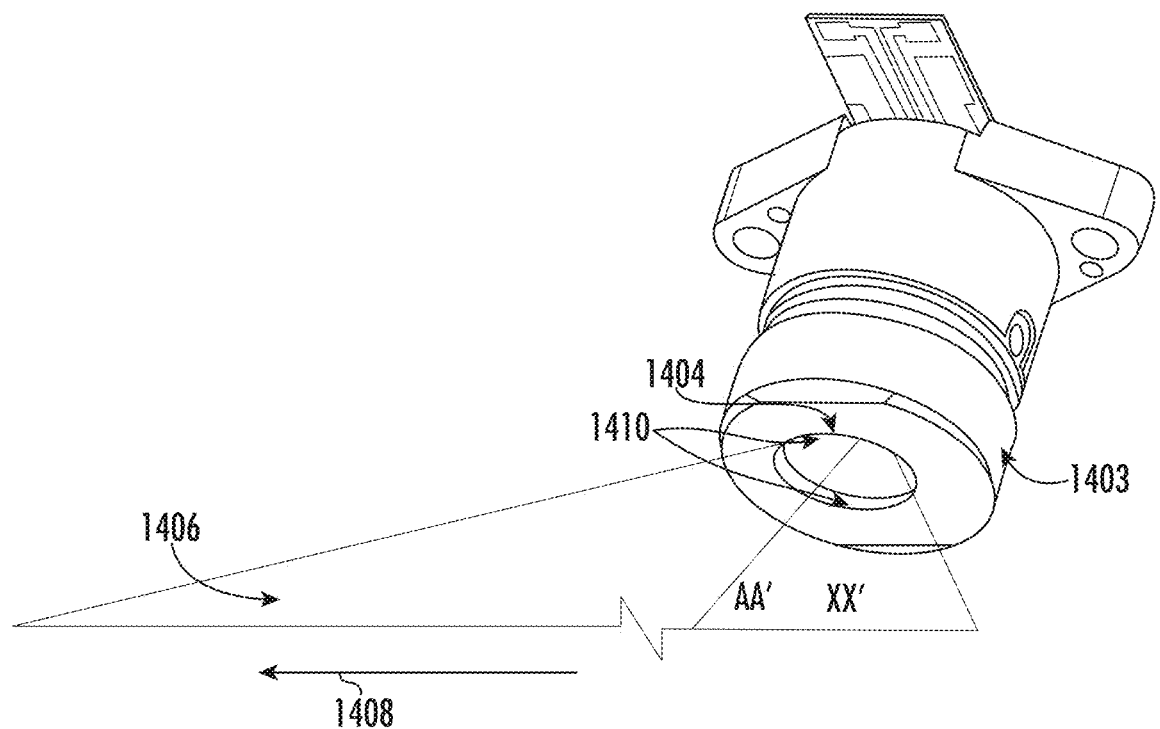

FIGS. 14A and 14B schematically illustrate cut-away perspective views 1400a and 1400b of a light pattern projector 1402 having a lens cap 1403 mechanically engaged over a lens assembly 1404 of the light pattern projector 1402. Further, FIGS. 14D and 14E schematically illustrate perspective views of the lens cap 1403 having an elliptically shaped aperture 1410 that is mechanically engaged over the light pattern projector 1402. In this regard, the light pattern projector 1402 with the lens cap 1403 engaged to it, is adapted to project the light pattern 1406 that is spatially offset in the direction 1408 with respect an axis of a lens assembly of the light pattern projector, in accordance with some example embodiments described herein. Illustratively, the light pattern projector 1402 projects a light pattern 1406 that is spatially offset in one direction 1408, with respect a central axis XX' of the lens assembly 1404 of the light pattern projector 1402, in accordance with some example embodiments described herein. In various embodiments, the central axis XX' of the lens assembly 1404 aligns with the central axis of the lens cap 1403 (see e.g., FIG. 10). As illustrated, the light pattern 1406 (or structured light) is projected out from a lens of the lens assembly 1404 (e.g., similar to as described with regard to the projector lens assembly 418 illustrated in FIG. 4) such that the light pattern 1406 is spatially offset towards the direction 1408. In this aspect, in accordance with various embodiments described herein, the offset in the projected light pattern 1406 may correspond to the offset value 'D'' between the axis XX' of a lens of the lens assembly 1404 and a center axis AA' of an elliptically shaped aperture defined by the lens cap 1403. In this regard, the center axis AA' of the elliptically shaped aperture represents an axis passing through a point of intersection of major axis and minor axis of the elliptically shaped aperture, as described in FIGS. 8, 10, 11A, 11B, 12A, and 12B respectively. For example, in various embodiments, the offset value 'D' between the central axis of the lens cap and the center axis of the elliptically shaped aperture through the lens cap may be the same as the offset 'D'' between the central axis of the projector lens assembly and the center axis of the projected light pattern.

Here, the offset value 'D'' in accordance with various embodiments described herein, may be depend on various factors. For example, in some embodiments, in cases, where the light pattern projector 1402 is within a housing of an imaging system, having an imaging unit (including a camera), the offset value 'D'' may depend on (i) a parallax arrangement of a light source, masking element, and lens of the light pattern projector 1402 for generating a structured light beam, and/or (ii) an axial separation between the lens assembly 1404 and an imaging unit within a housing of the light pattern projector 1402. To this extent, as shown in FIGS. 2 and 3, the light pattern 1406 is projected at the offset value 'D", so that the projected pattern 1406 and/or the reflection of the projected pattern from one or more objects is effectively sensed by an image sensor of the imaging unit of the imaging system. In various embodiments, when the lens cap 1403 is mechanically engaged over the lens assembly 1404, a central axis of overall circular body the lens cap (similar to the central axis 1012 as described in FIG. 10 or axis XX' as described in FIG. 8) would be coaxial with the central axis XX' of the lens assembly 1404 as illustrated in FIGS. 14A-14C. FIG. 14C schematically illustrates a side view 1400c (similar to the side view illustrated in FIG. 9) of the light pattern projector 1402 having the lens cap 1403 mechanically engaged over the lens assembly 1404 of the light pattern projector 1402, where the light pattern projector 1402 projects the light pattern 1406 that is spatially offset in the direction 1408 (e.g., the light pattern 1406 is not centered on the central axis XX' of the lens assembly 1404 and/or the lens cap 1403), in accordance with some embodiments. As illustrated from the side view 1400c, an elliptically shaped aperture (similar to elliptically shaped apertures 606, 716, 1008, 1106, and 1206, as illustrated and described in FIGS. 7-12) of the lens cap 1403 towards its peripheral ends is chamfered 1410 with a defined slope. For example, referring to FIG. 14C, the elliptically shaped aperture of the lens cap 1403 has chamfered peripheral ends 1410 having a defined slope, represented by slope of lines PP' and QQ', as the elliptically shaped aperture extends out from a back surface to a front surface of the lens cap 1403. In this aspect, the slope of the chamfered 1410 peripheral end of the aperture may be consistent about the perimeter of the aperture and is defined based on various factors. For instance, in one example, the slopes of lines PP' and QQ' (representing the slope of the chamfered 1410 peripheral end) may be based on an axial distance between the lens assembly 1404 of the light pattern projector 1402 and a back surface of the lens cap 1403, as in, when the lens cap 1403 is engaged over the lens assembly 1404. Also, in some examples, the slope may be based on a desired corner reduction ration representative of a vignetting desired in the projected light pattern 1406, to suppress corner peak radiation in a pattern profile of the light pattern 1406 and to realize controlled dark corners when the light pattern 1406 is incident on a surface. In an example embodiment, the slop of the chamfered 1410 peripheral end of the aperture may be different at various portions of the perimeter of the aperture. For example, the slopes of lines PP' and QQ' may be different. For example, PP' may not simply be a rotation or reflection of QQ', in an example embodiment.

Additionally, or alternatively, according to some embodiments, the slope of the chamfered 1410 ends of the elliptically shaped aperture may be defined based on analyzing results obtained after multiple simulations and testing of the light pattern projector 1402. In this aspect, the simulation and/or testing as mentioned may be performed to evaluate the light pattern projector's 1402 performance based on radiation level distribution over an entire field of view of the projector 1402 in order to achieve an exact amount of vignetting required to meet laser eye safety standards while minimizing an impact to performance of the light pattern projector 1402 in terms of power output levels of illumination. Accordingly, the slope of the chamfered 1410 peripheral ends of the elliptically shaped aperture may be defined to generate vignetting in the light pattern for specific locations with required corner reduction ratio, as described earlier in reference to FIG. 6.

Figure 15:
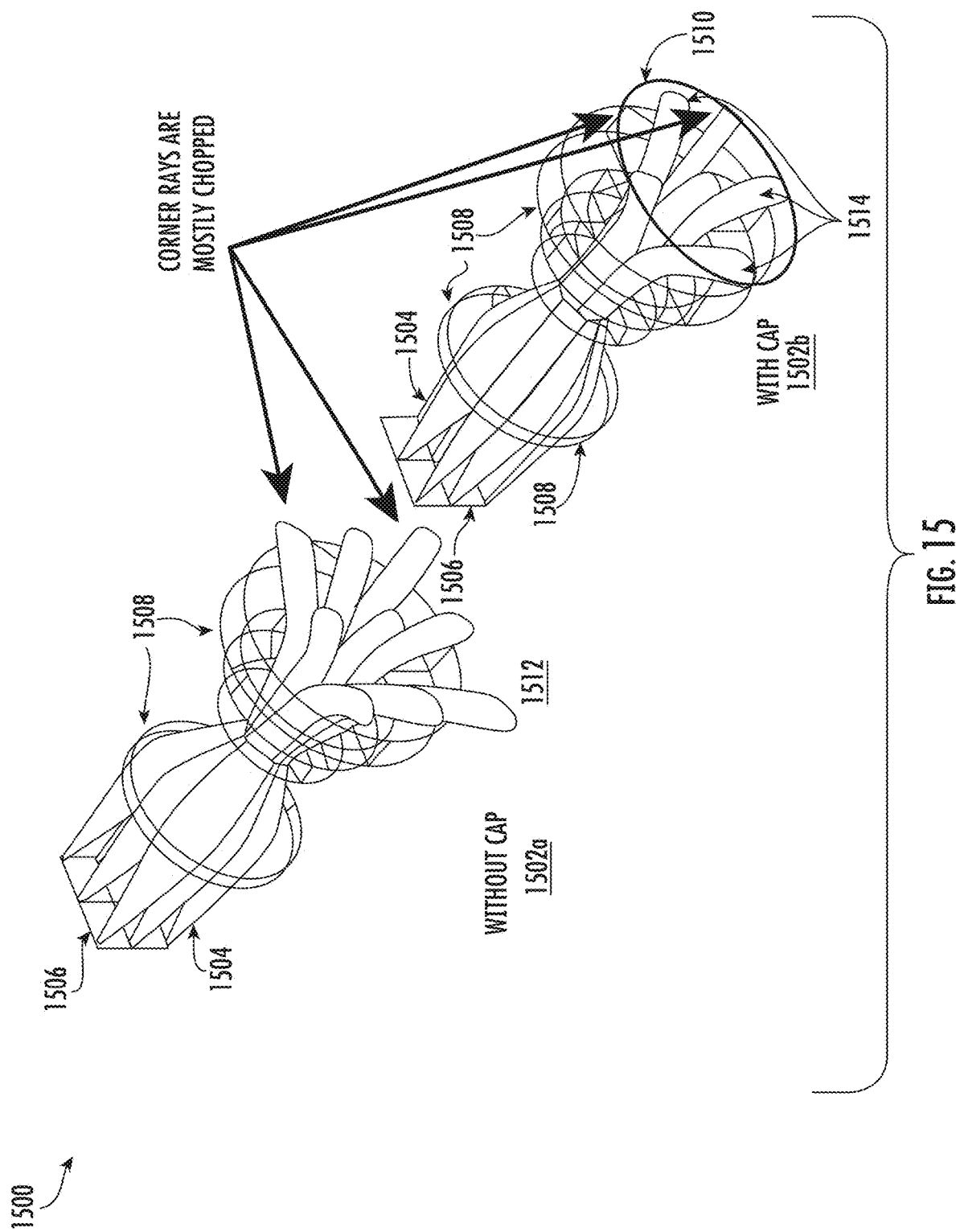
FIG. 15 schematically illustrates vignetting of outermost rays of optical radiation such as, a light pattern, by using a lens cap along with a light pattern projector, in accordance with some embodiments described herein.

FIG. 15, schematically illustrates, vignetting of outermost rays in optical radiation such as, a light pattern or structured light projected by a light pattern projector, based on using a lens cap along with the light pattern projector, in accordance with some embodiments described herein. As illustrated, a first arrangement 1502a depicts a trajectory of optical radiation, for instance, structured light 1504, as it is projected from a light source (for instance the light source 402 as illustrated in FIG. 4) of the light pattern projector, via a masking element 1506, in an instance, while a lens assembly 1508 of the pattern projector is used without a lens cap. A second arrangement 1502b depicts another trajectory of the structured light 1504, via the masking element 1506 of the light pattern projector, in an instance, while the lens assembly 1508 of the pattern projector is used along with a lens cap 1510.

Illustratively, as compared with the first arrangement 1502a, referring to the second arrangement 1502b (i.e. one with lens cap 1510) outermost rays 1514 of a projected laser beam of light defining the structured light 1504 are chopped off and/or at least partially blocked as the structured light 1504 is projected out from the lens assembly 1508 and through the lens cap 1510. In this aspect, the intensity of the outermost rays in the projected light beam defining the structured light 1504 is reduced as the structured light 1504 travels through an aperture (for example, the elliptically shaped apertures 1106, 1206 as illustrated in FIGS. 11A, 11B, 12A, and 12B respectively) of the lens cap 1510. To this extent, the chamfered periphery (1108, 1208) of the elliptically shaped aperture of the lens cap 1510 at least partially blocks passage of the structured light 1504 through the aperture of the lens cap 1510, thereby causing vignetting of the structured light 1504 towards corners, periphery and/or edges of the light pattern defined by the structured light 1504. In accordance with one example implementation of said embodiments, at a standard operation of an optical pattern projector that emits 5 pulses per second via a light source, a power limit measured at 100 mm distance from the lens assembly 1508, where a diameter of an aperture of the lens cap is 7 mm may be 175 uw or less. In this aspect, a comparison of results obtained without using the lens cap 1510 and with using the lens cap 1510 are further illustrated in FIGS. 16A and 16B.

Figure 16A:
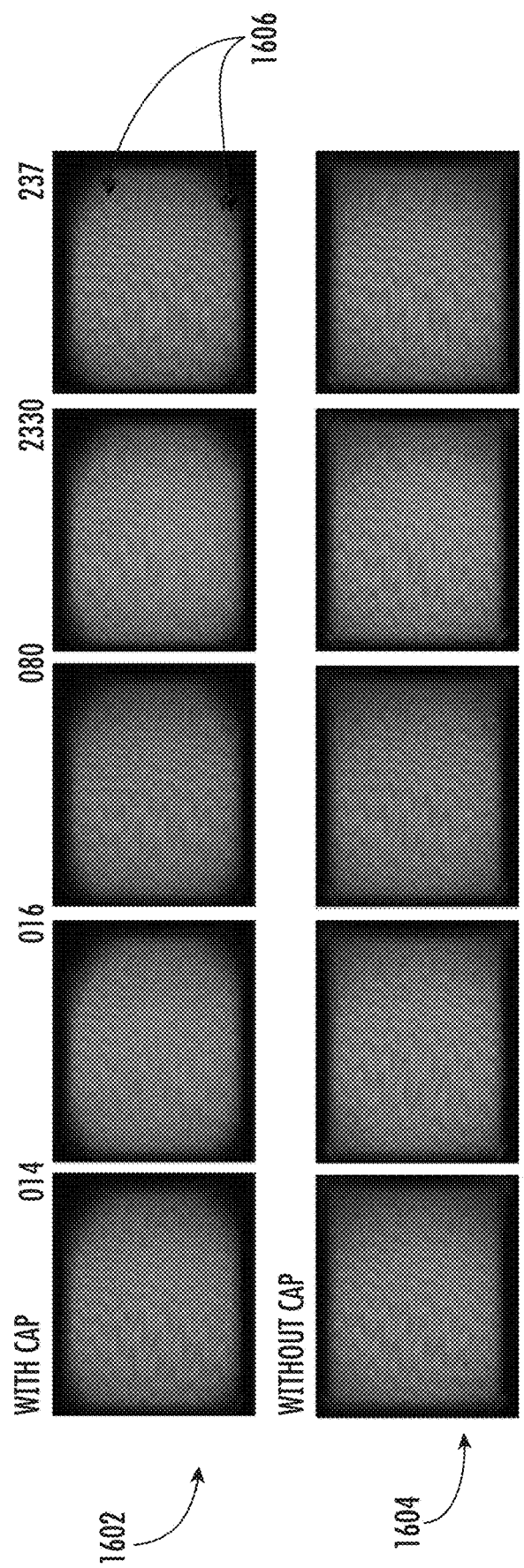
FIGS. 16A and 16B, schematically illustrates, simulation results including, results depicting illumination of a surface with vignetting by using the light pattern projector with lens cap, as compared to, results depicting illumination of a surface by using the light pattern projector without lens cap, in accordance with various embodiments described herein.
Figure 16B:
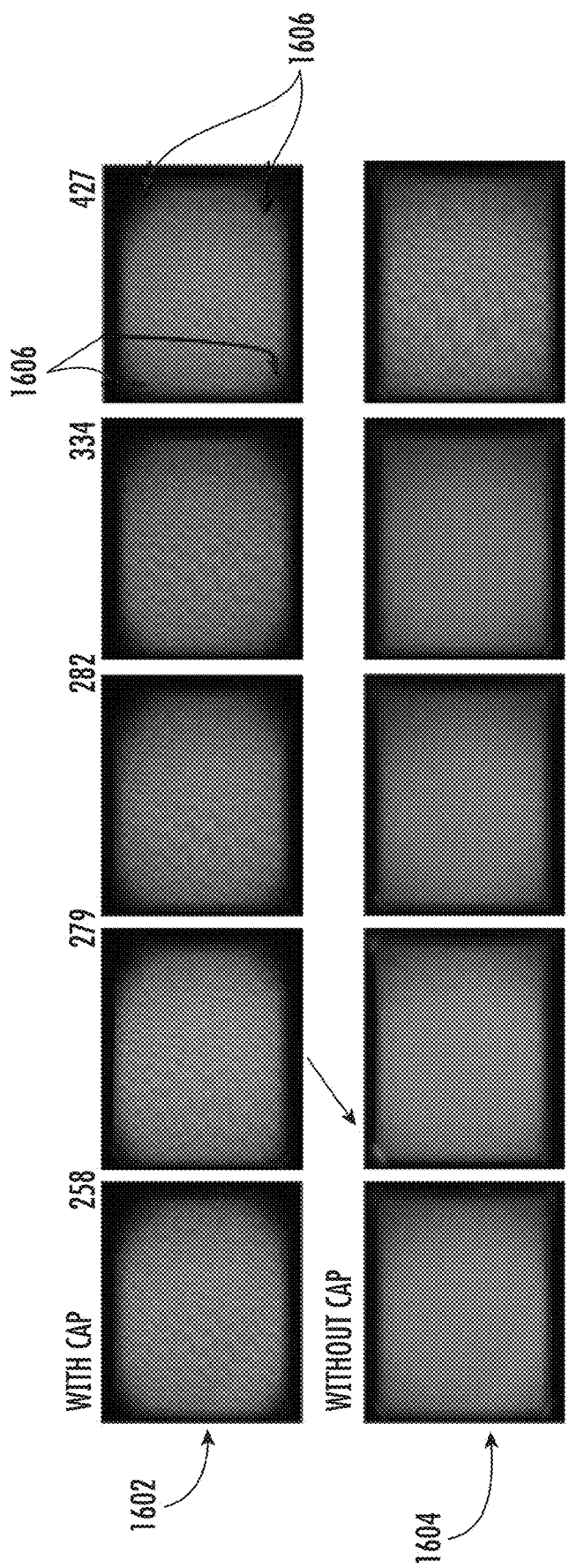

FIGS. 16A and 16B schematically illustrate simulation results including results depicting illumination of a surface with vignetting by using the light pattern projector with a lens cap and results depicting illumination of a surface by using the light pattern projector without the lens cap, in accordance with various embodiments described herein. Illustratively, 1602 depicts sample results including multiple test pattern images obtained, upon simulation of an optical pattern projector arrangement (for instance, the light pattern projector 400, as illustrated in FIG. 4) using a lens cap, (for example, any of the lens caps 1100 or 1200, as illustrated in FIGS. 11A, 11B, 12A, 12B respectively). Comparatively, 1604 depicts results obtained without using the lens cap. In this aspect, the results 1602 and 1604, as illustrated herein, each represent various images of a light pattern (e.g., structured light) incident on a surface of an object. As illustrated in 1602, the brightness or saturation in the light pattern towards corners or periphery of the light pattern 1606, is suppressed and/or reduced due to vignetting of the light pattern by the lens cap (e.g., any of the lens caps 1100 or 1200, as illustrated and described in reference to FIGS. 11A, 11B, 12A, 12B respectively). To this extent, as illustrated in one or more images of test patterns, for instance the results 1602, using a lens cap effectively suppresses any leakages and/or increased intensity about the corners, periphery, and/or edges of a light pattern projected by a light pattern projector that may be above a safety standard (e.g., laser safety standards) that are required to be met.

In accordance with some example embodiments, a range of an offset, for instance, the offset value 'D' as described in reference to FIGS. 10 and 14A-14E, may be from about 0.5 mm to about 0.8 mm. Further, in accordance with some example embodiments, with respect to elliptically shaped aperture on the lens cap, a range of major axis (for example the major axis PQ or MA, as illustrated in FIGS. 8, 11A, 11B, 12A, and 12B respectively) of the aperture may be from about 6.5 mm to about 8.00 mm and a range of minor axis (for example the minor axis MN and MR', as illustrated in FIGS. 8, 11A, 11B, 12A, and 12B respectively) of the elliptically shaped aperture may be from about 4.93 mm to about 5.93 mm respectively. Also, in accordance with various embodiments described herein, the lens cap may be made up of injection molded polycarbonate (PC)-ABS material, for instance PC500 with matte surface finish.

Although the aperture through the lens cap is generally referred to as an elliptically shaped aperture herein, various other shape apertures are considered. For example, various shape apertures (circular, square, rectangular, trapezoidal, irregular, and/or the like) may be used in various embodiments, as appropriate for the applications and the corresponding light patterns.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-Ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. A lens cap having, a cylindrical casing comprising:
 a back surface, adapted to be mechanically engaged over a lens assembly of a light pattern projecting unit, the back surface defining a recess;
 a front surface defining an elliptically shaped aperture that extends from a portion of the front surface into the recess, wherein a periphery of the elliptically shaped aperture is chamfered as the elliptically shaped aperture extends from the front surface of the lens cap into the recess, and wherein a center axis, passing orthogonally through the front surface and the back surface of the lens cap and via a point of intersection of a major axis and a minor axis of the elliptically shaped aperture, is offset from a central axis of the lens cap;
 wherein the recess defines one or more features facilitating coupling of the lens cap with the lens assembly.

2. The lens cap of claim 1, wherein, a cross-section of the elliptically shaped aperture is adapted to match a field of view of the light pattern projecting unit, as the lens cap is mechanically engaged over a lens assembly of the light pattern projecting unit.

3. The lens cap of claim 1, wherein the elliptically shaped aperture of the lens cap is adapted to at least partially block outermost rays which are at a periphery of a projected laser beam defining the projected pattern, as the light pattern projected from a lens assembly of the light pattern projecting unit passes through the elliptically shaped aperture of the lens cap.

4. The lens cap of claim 1, a length of the major axis and a length of the minor axis of the elliptically shaped aperture is based on a defined value to which the projected light pattern is offset from a center axis of the lens of the light pattern projecting unit.

5. The lens cap of claim 1, wherein a slope of chamfered periphery of the elliptically shaped aperture is based on at least one of: (i) an axial distance between a lens assembly of the light pattern projecting unit and the back surface of the lens cap and (ii) a corner reduction ratio of the projected pattern, wherein the corner reduction ratio is representative of a desired percentage decrease, in intensity of outermost rays of a projected laser beam defining the projected light pattern.

6. The lens cap of claim 1, wherein a slope of chamfered periphery of the elliptically shaped aperture causes vignetting of outermost rays of projected laser beam defining the projected pattern and wherein an offset in the center axis of the elliptically shaped aperture is to match an offset of the projected light pattern projected by a light source through a lens of the light pattern projecting unit.

7. The lens cap of claim 1, wherein a length the major axis of the elliptically shaped aperture is in a range from about 6.5 mm to about 8.0 mm and wherein a length of the minor axis of the elliptically shaped aperture is in a range from about 4.93 mm to about 5.93 mm.

8. An imaging system comprising, an alignment feature assembly comprising:
a front face;
a back face, wherein the back face defines an aperture that extends from the back face to the front face of the alignment assembly;
a light pattern projecting unit comprising a projector lens assembly, the light pattern projecting unit adapted to project structured light in a field of view of the light pattern projecting unit, wherein the light pattern projecting unit is configured to be coupled to the back face of the alignment feature assembly;
a lens cap having, a back surface adapted to be mechanically engaged over the projector lens assembly of the light pattern projecting unit; and
a front surface defining an elliptically shaped aperture, on a portion of the front surface, wherein the elliptically shaped aperture is chamfered towards a periphery at which the elliptically shaped aperture extends out from the back surface to the front surface of the lens cap and wherein a center axis, passing orthogonally through the front surface and the back surface and via a point of intersection of a major axis and a minor axis of the elliptically shaped aperture, is offset from a central axis of the lens cap, wherein the lens cap is received within the aperture of the alignment feature assembly,
wherein alignment feature assembly is rotatable with respect to the lens assembly to align and affix the lens cap with the lens assembly.

9. The imaging system of claim 8, wherein the elliptically shaped aperture is chamfered towards a periphery at which the elliptically shaped aperture extends out from the back surface to the front surface of the lens cap and wherein a center axis, passing orthogonally through the front surface and the back surface and via a point of intersection of a major axis and a minor axis of the elliptically shaped aperture, is offset from a central axis of the lens cap.

10. The imaging system of claim 8, wherein, a cross-section of the elliptically shaped aperture is adapted to match a field of view of the light pattern projecting unit, as the lens cap is mechanically engaged on a lens assembly of the light pattern projecting unit.

11. The imaging system of claim 8, a length of the major axis and a length of the minor axis of the elliptically shaped aperture is based on a defined value to which the projected structured light is offset from a center axis of the lens of the light pattern projecting unit.

12. The imaging system of claim 8, wherein a slope of chamfered periphery of the elliptically shaped aperture is based on at least one of: (i) an axial distance between a lens of the light pattern projecting unit and the back surface of the lens cap and (ii) a corner reduction ratio of the projected pattern, wherein the corner reduction ratio is representative of a desired percentage decrease, in intensity of outermost rays of a projected laser beam defining the structured light.

13. The imaging system of claim 8, wherein a slope of chamfered periphery of the elliptically shaped aperture causes vignetting of outermost rays of projected laser beam defining the structured light and wherein an offset in the center axis of the elliptically shaped aperture is to match an offset of the structured light projected by a light source through a lens assembly of the light pattern projecting unit.

14. The imaging system of claim 8, wherein a length the major axis of the elliptically shaped aperture is in a range from about 6.5 mm to about 8.0 mm and wherein a length of the minor axis of the elliptically shaped aperture is in a range from about 4.93 mm to about 5.93 mm.

15. The imaging system of claim 8, wherein the lens cap is adapted to be engaged over the light pattern projecting unit using at least one of, a snap fit arrangement and an adhesive.

16. The imaging system of claim 8, wherein the lens cap is adapted to be engaged over the light pattern projecting unit using an alignment features having a structure that is adapted to recess the lens cap to engage the lens cap over the light pattern projecting unit and wherein the lens cap comprises threadings that are adapted to be engaged with complimentary threadings on surface of the pattern projecting unit.

17. The imaging system of claim 8, wherein the lens cap is formed of injection molded polycarbonate-ABS-thermoplastic and is of thickness of about 1 mm and wherein the thickness of chamfered periphery of the elliptically shaped aperture is of thickness of about 0.5 mm.

18. The imaging system of claim 8, wherein the front face of the alignment feature assembly defines one or more alignment features, wherein the alignment feature define a seat, and wherein the seat is configured to receive the lens cap such that the elliptical aperture of the lens cap aligns with the aperture of the lens assembly.

19. An imaging system comprising:
a light pattern projecting unit comprising a projector lens assembly, the light pattern projecting unit adapted to project structured light in a field of view of the light pattern projecting unit;
a lens cap having, a back surface adapted to be mechanically engaged over the projector lens assembly of a light pattern projecting unit, the back surface defining a recess; and
a front surface defining an elliptically shaped aperture, on a portion of the front surface, wherein the elliptically shaped aperture extends from the front surface into the recess, wherein the elliptically shaped aperture is chamfered towards a periphery at which the elliptically shaped aperture extends from the front surface of the lens cap into the recess, and wherein a center axis, passing orthogonally through the front surface and the back surface and via a point of intersection of a major axis and a minor axis of the elliptically shaped aperture, is offset from a central axis of the lens cap, wherein the recess defines one or more features facilitating coupling of the lens cap with the lens assembly.

* * * * *